United States Patent
Wu et al.

(10) Patent No.: US 12,487,268 B2
(45) Date of Patent: Dec. 2, 2025

(54) EQUIPMENT DESIGN AND TESTING USING IN-SITU ON-DIE TIME-DOMAIN REFLECTOMETRY

(71) Applicant: XILINX, INC., San Jose, CA (US)

(72) Inventors: Zhaoyin Daniel Wu, Los Gatos, CA (US); Tianyu Fang, San Jose, CA (US); Chuen-Huei Chou, San Jose, CA (US); Christopher J. Borrelli, Los Gatos, CA (US); Geoffrey Zhang, San Jose, CA (US)

(73) Assignee: XILINX, INC., San Jose, CA (US)

( * ) Notice: Subject to any disclaimer, the term of this patent is extended or adjusted under 35 U.S.C. 154(b) by 231 days.

(21) Appl. No.: 18/128,942

(22) Filed: Mar. 30, 2023

(65) Prior Publication Data

US 2024/0329110 A1 Oct. 3, 2024

(51) Int. Cl.
  *G01R 31/11* (2006.01)
  *G01R 31/52* (2020.01)

(52) U.S. Cl.
  CPC .............. *G01R 31/11* (2013.01); *G01R 31/52* (2020.01)

(58) Field of Classification Search
  CPC ................................ G01R 31/11; G01R 31/52
  USPC ........................................................... 324/534
  See application file for complete search history.

(56) References Cited

U.S. PATENT DOCUMENTS

| | | | | |
|---|---|---|---|---|
| 4,766,386 A * | 8/1988 | Oliver | ..................... | G01R 31/11 324/533 |
| 5,319,363 A * | 6/1994 | Welch | ...................... | H04Q 9/00 340/12.3 |
| 6,016,464 A * | 1/2000 | Richardson | ............ | G01R 31/11 324/533 |
| 6,124,717 A * | 9/2000 | Guenther, Jr. | ......... | G01R 31/11 324/642 |
| 6,512,377 B1 * | 1/2003 | Deng | ................... | G01R 31/281 324/533 |
| 7,173,443 B1 * | 2/2007 | Asami | .............. | G01R 31/31935 324/76.15 |

(Continued)

FOREIGN PATENT DOCUMENTS

WO     WO-0207419 A2 *    1/2002    ............. G01R 27/28

*Primary Examiner* — Christopher P McAndrew
(74) *Attorney, Agent, or Firm* — Patterson + Sheridan, LLP

(57) ABSTRACT

Using "in-situ on-die time-domain reflectometry (TDR)" with data signal paths of integrated circuits, printed circuit boards, and data processing equipment and systems allows testing, verification and troubleshooting of data channel signal path impedance variations including the package, escape routing, socket, board, and cable/connectors provides fast characterization thereof. Operation of "in-situ on-die TDR" uses existing analog-to-digital converter (ADC) and data transmitter (TX) drivers of an integrated circuit to act as a TDR sampling head by performing a user interface-based TDR sampling with a step-waveform generated by an integrated circuit TX driver. Then sampling the step-waveform with the ADC of the integrated circuit using spline interpolation to obtain the over-sampled waveform. Once the sampled step-waveform is obtained, the TDR profile of the sampled data channels may be calculated. Large amounts of impedance variation data may thus be collected during either integrated circuit manufacturer or customer-built data communications channel testing.

20 Claims, 25 Drawing Sheets

(56) References Cited

U.S. PATENT DOCUMENTS

| | | | | |
|---|---|---|---|---|
| 7,405,575 | B2 * | 7/2008 | Tan | G01R 35/005 |
| | | | | 702/109 |
| 7,650,248 | B1 * | 1/2010 | Baxter | G01R 31/318519 |
| | | | | 341/157 |
| 10,999,922 | B1 * | 5/2021 | Ziegler | G01R 31/2812 |
| 2012/0306895 | A1 * | 12/2012 | Faulkner | H04B 3/46 |
| | | | | 379/27.01 |
| 2013/0201316 | A1 * | 8/2013 | Binder | H04L 67/12 |
| | | | | 701/2 |
| 2022/0341990 | A1 * | 10/2022 | Moreno | H04L 9/3278 |

* cited by examiner

EQUIPMENT DESIGN AND TESTING USING IN-SITU ON-DIE TIME-DOMAIN REFLECTOMETRY

TECHNICAL FIELD

Embodiments of the present disclosure generally relate to design and testing of integrated circuit equipment, and in particular, to design and testing of integrated circuit equipment with circuit simulation and hardware measurements using in-situ on-die time-domain reflectometry (TDR).

BACKGROUND

Time-Domain Reflectometry (TDR) has been a well-adopted tool to find defects or damaged locations along a signal path. A discontinuity (open or short) will cause a signal amplitude reflection from the discontinuity that can be measured at the source of an excitation in the step format. An impedance of the discontinuity can be determined from the amplitude of the reflected signal. The distance to the discontinuity (reflecting impedance) can be determined from the measured time that the reflected signal takes to return to the source location. This is a valuable diagnostic tool that can help narrow down which defective module (field replaceable unit-FRU) needs replacing. When thousands of nodes are connected together, such as in large super-computer configurations, having tools to automatically detect open circuit and short circuit faults and their locations can save a lot of trial-and-error to avoid arbitrary FRU-swapping.

SUMMARY

In one example of the disclosure, a method of using in-situ on-die time-domain reflectometry (TDR) for testing an integrated circuit equipment communications channel includes sending a data pattern to a driver of a transmitter to generate a step waveform at a transmit node. Coupling an analog-to-digital converter (ADC) of a receiver to a circuit node of a data circuit under test. Opening a connection to the data circuit to obtain an open circuit step voltage when applying the step waveform to the transmit node. Determining an output resistance of the transmit node with a low frequency measurement. Terminating an output of the data circuit under test. Applying the step waveform to the data circuit under test to measure a time varying detected voltage with the ADC of the receiver. Then calculating a time varying load impedance from the time varying detected voltage, the open circuit step voltage and the output resistance of the transmit node.

In one example of the disclosure, an integrated circuit data transceiver (transmitter/receiver) having in-situ on-die time-domain reflectometry (TDR) circuits for testing a data communications channel while coupled to the data communications channel includes a data driver coupled to a transmit node, a near-end analog-to-digital converter (ADC) adapted for coupling to the transmit node, a far-end ADC adapted for coupling to a receive node and data signal connections adapted for coupling the transmit and receive nodes to the data communications channel. When in a TDR test mode, the data driver provides a step waveform to the transmit node and the near-end ADC for monitoring a time varying voltage at the transmit node. When in an operational mode, the data driver transmits data to the transmit node and the far-end ADC, at the receive node, receives the data.

In one example of the disclosure, a data communications system includes an integrated circuit data transceiver (transmitter/receiver) having in-situ on-die time-domain reflectometry (TDR) circuits. The integrated circuit data transceiver includes a data driver coupled to a transmit node, an analog-to-digital converter (ADC) adapted for coupling to either the transmit node or a receive node, and data signal connections adapted for coupling the transmit and receive nodes to a data communications channel, wherein the data communications channel includes at least one data communications cable coupled to the data signal connections, and at least one network adapter, coupled to the at least one data communications cable, and having data receive and transmit capabilities. A plurality of network adapters may be coupled together through a plurality of data communications cables.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
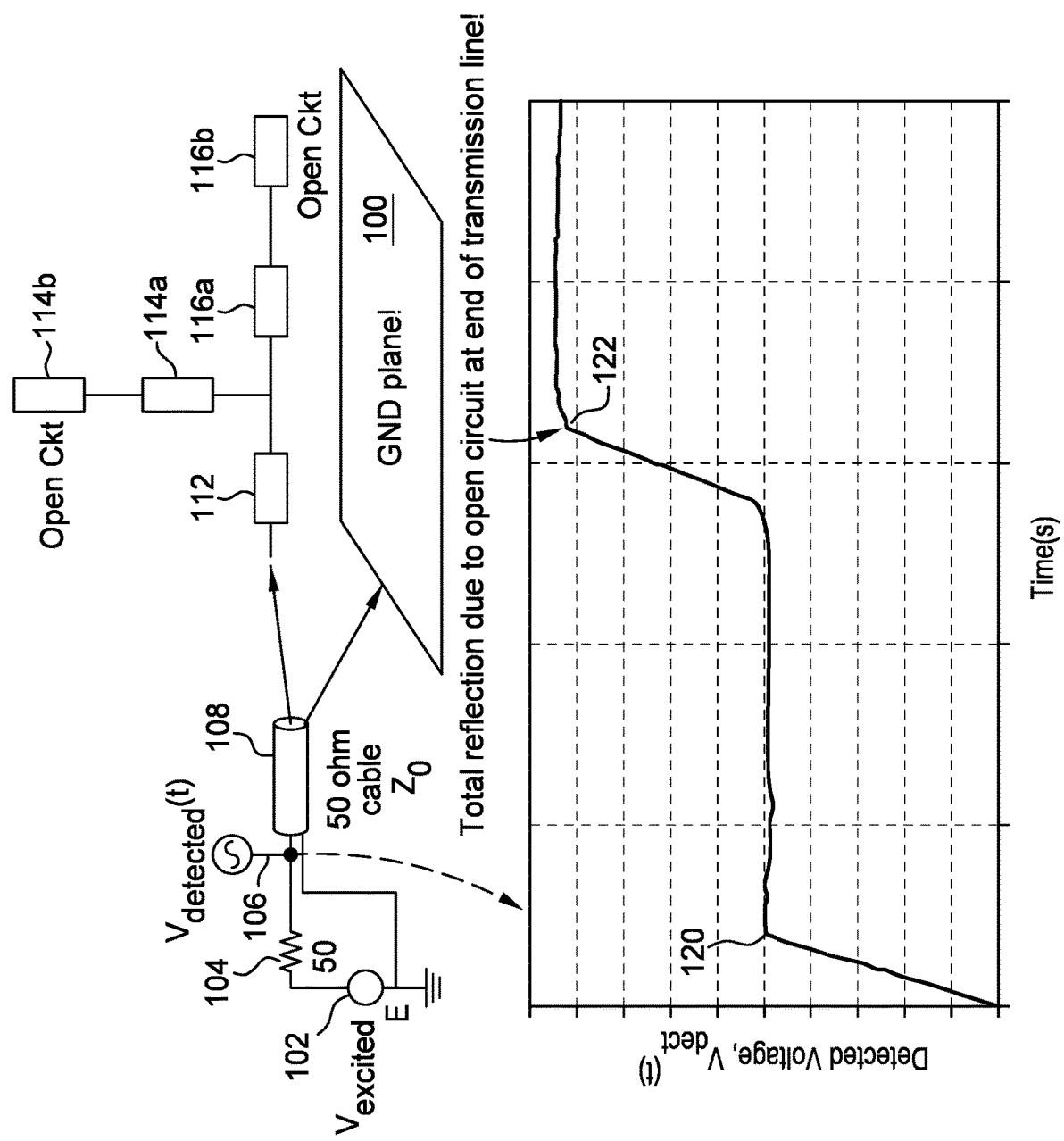
FIG. 1 illustrates a schematic diagram and voltage-time graph of a TDR measurement configuration.

To facilitate understanding, identical reference numerals have been used, where possible, to designate identical elements that are common to the figures, and a lower-case letter added where the elements are substantially the same. It is contemplated that elements of one embodiment may be beneficially incorporated in other embodiments.

DETAILED DESCRIPTION

Prior techniques to collect impedance variations including the package, escape routing, socket, board, and cable/connector contributions to signal transmission impedances required pre-manufactured electromagnetic simulations to predict the variation. For a post-manufactured stage, a test coupon was required next to a device under test (DUT) or destructive measurement was required to collect the data signal impedance variations.

Examples herein provide for using "in-situ on-die time-domain reflectometry (TDR)" for electrical verification of data signal paths of integrated circuits, printed circuit boards, and data processing equipment and systems. Using in-situ TDR allows testing, verification and troubleshooting of data channel signal path impedance variations including the package, escape routing, socket, board, and cable/connector characterization within a short period of time. The concept and operation of "in-situ on-die TDR" allows using existing analog-to-digital converter (ADC) and data transmitter (TX) drivers of an integrated circuit to act as a sampling head, of commercial instrument quality, by performing a user interface-based TDR sampling with a step-data pattern generated by the integrated circuit data TX driver, and then sampling the data waveform with the ADC and using spline interpolation to obtain the over-sampled waveform. Once the sampled step waveform is obtained, the TDR profile of every data channel sampled may be calculated. This will provide a large amount of impedance variation data being collected from either integrated circuit manufacturer or customer-built channels with a round or a few rounds of product testing.

An integrated circuit TX driver may generate a step waveform even-better-than a TDR test instrument. In addition, the receiver (RX) sampling rate can reach an extremely high-speed data-rate using a serializer/de-serializer (SerDes) having a processing data rate as good as or better-than a TDR instrument. Voltage resolution in the modern SerDes having 6-bit or 7-bit ADC sampling front-end is not uncommon. Therefore, with available hardware circuits, a built-in TDR circuit may be utilized for both internal and external testing of SerDes transceivers and accompanying hardware circuits and systems. Thus, using existing circuit functions, a TDR profile may be generated of the exact communications channel being used to transmit the data when it is switched to a non-mission mode (TDR testing) without having to damage or alter the normal data channel hardware circuits. A simple data path reconfiguration circuit may be implemented for both normal data channel operation or TDR testing operation.

This disclosure provides a step-by-step procedure to obtain hardware verification of a TDR profile using an ADC-based transceiver, and a detailed setup for a circuit simulator to obtain a TDR profile of a distributed circuit design. To enable this function in the hardware, the TX and RX circuit designers will need to prepare the simulation data in terms of $R_{src}$ and the transfer function between the probing node and ADC sampling node. As soon as a TDR on control signal is set to 'high', the step waveforms can be sampled with a user interface (UI) sampling period by a 6-bit ADC implemented for high-speed SerDes operation. The TDR profile can be generated without changing the on-die TX and RX circuits. Although the study shows the needed ADC bit resolution is higher than the one implemented for high-speed SerDes to keep the high fidelity of impedance value, it is more than enough to do the test for an open or short, and their correspondent locations on the communications channel. The ADC may be oversampled.

An advantage of the solutions presented herein are non-destructive tests for impedance profiles along a data communications channel. For example, a PAD loopback may be implemented for a test to loop the signal back to the RX ADC from TXPAD. Therefore, existing hardware may be used for a channel under test (for example the channel including IC package, socket, BGA escape routing, cable/connector, etc.) being connected while doing the test of a TX/RX PAD loopback, and then collect the ADC sampled data to calculate impedance profiles and do voltage/impedance-time plots according to the teachings of this disclosure.

Various features are described hereinafter with reference to the drawing figures. It should be noted that the drawing figures may or may not be drawn to scale and that the elements of similar structures or functions are represented by like reference numerals throughout the drawing figures. It should be noted that the drawing figures are only intended to facilitate the description of the features of the examples. They are not intended as an exhaustive description of the examples below or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described. Referring now to the drawing figures, the details of examples are schematically illustrated. Like elements in the drawing figures will be represented by like numbers, and similar elements will be represented by like numbers with a different lower-case letter suffix.

Referring to FIG. 1, depicted is a schematic diagram and voltage-time graph of a TDR measurement configuration. This TDR measurement configuration comprises a voltage pulse generator 102 having a source impedance 104, a voltage detector 106 measuring a time dependent voltage waveform, $V_{detected}(t)$, and a transmission line 108 having a characteristic impedance, $Z_o$, of the source impedance 104 (50 ohms). A TDR voltage step output from the transmission line 108 is coupled to data transmission structures 112, 114 and 116 having, for example, active and passive circuits (not shown) and lengths of high-speed data transmission lines, having characteristic impedances and physical lengths, coupling together these data transmission structures 112, 114 and 116. Initiation of a voltage pulse is shown at graph point 120 of the voltage-time curve of the graph of FIG. 1. A signal reflection (e.g., open circuit) at a transmission line point farther away is shown at graph point 122. Distance of the change of the transmission line impedance can be derived from the time between the graph points 120 and 122.

FIG. 1 is a visualization for the derivation of a conversion from a detected waveform of a TDR system test to an impedance profile of the data transmission paths of the system under test.

$$V_{detected}(t) = V_{inc} + V_{reflect}(t), \text{ where } V_{inc} = \frac{Z_0}{50+Z_0} V_{excited} \quad \text{Equation (1)}$$

$$\text{Since } \frac{V_{reflect}(t)}{V_{inc}} = \Gamma_{tested}(t) = \frac{Z_L(t)-Z_0}{Z_L(t)+Z_0} \rightarrow \frac{V_{detected}(t)-V_{inc}}{V_{inc}} = \frac{Z_L(t)-Z_0}{Z_L(t)+Z_0}$$

$$\rightarrow \frac{V_{detected}(t)}{V_{inc}} = \frac{2 \cdot Z_L(t)}{Z_L(t)+Z_0} \rightarrow Z_L(t) = \frac{V_{detected}(t)}{2 \cdot V_{inc} - V_{detected}(t)} * Z_0$$

$$\text{if } Z_0 = 50\Omega, \text{ then } V_{inc} = \frac{V_{excited}}{2}$$

$$Z_L(t) = \frac{V_{detected}(t)}{V_{excited} - V_{detected}(t)} * Z_0$$

$V_{excited}$ is user definable when doing a SPICE simulation. $V_{detected}(t)$ is a nodal voltage at the input of a device under test (DUT). The above derivation is for a conventional TDR when measuring a passive component such as cable, connector, package or PCB traces.

Figure 2A:
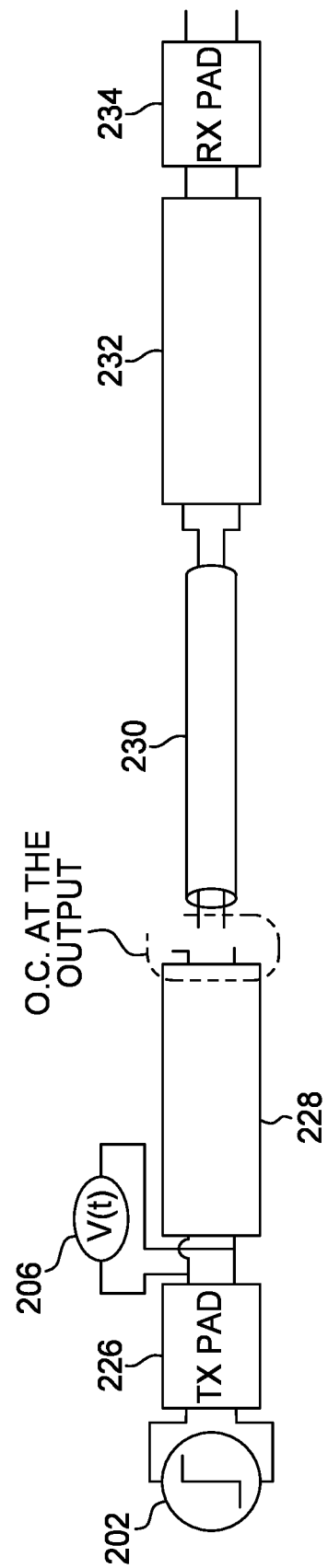
FIG. 2A illustrates an example schematic block diagram of a data communications system with an open circuit outside the TX circuit and having TRD capabilities for determining data communications circuit continuity.
Figure 2B:
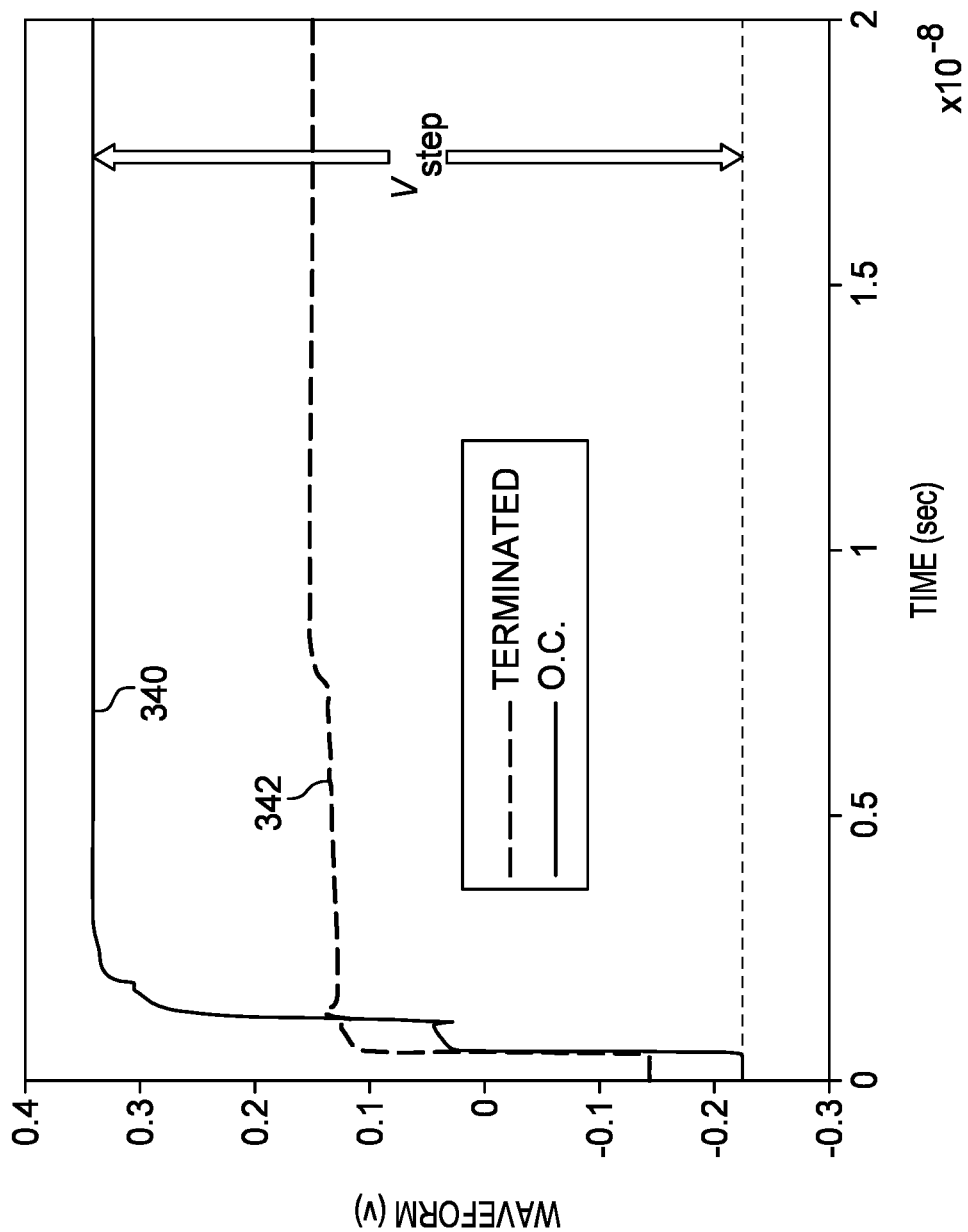
FIG. 2B illustrates a schematic voltage-time graph for determining a $V_{step}$ voltage from the maximum swing of a $V_{detected}$ waveform.

The voltage pulse generator 102, which generates the step waveform for a TDR measurement, is a main component of a conventional TDR. The in-situ on-die TDR may be used to investigate the impedance continuity of distributed circuits designed to provide a broadband frequency high-speed data response. There are two advantages in circuit design and testing using the in-situ on-die TDR for measurements of a DUT (physically or SPICE) while keeping the DUT circuit intact. The first advantage is that the TX circuit of the DUT already has included the bias circuitry, so it is not difficult to just use the existing step source excitation without disrupting the TX circuitry of the DUT. The second advantage is that the step waveform may be driven from the TX circuit of the DUT, with present semiconductor technology, the step pulse rise time may be even shorter (like the waveform probed at the $V_{detected}$ node 106) than a step pulse generated from a TDR instrument sampling head. Therefore, equation (1) may be re-written as equation (2):

$$Z_L(t) = \frac{V_{detected}(t)}{V_{step} - V_{detected}(t)} * R_{src} \quad \text{Equation (2)}$$

Where $V_{step}$ can be obtained from the maximum swing of the $V_{detected}$ waveform, as shown in FIG. 2B, by introducing an open circuit outside the TX circuit such as unconnected (open) IC package connections as shown in FIG. 2A. $R_{src}$ is the real part of the output impedance (at the lowest test frequency) looking into the TX circuit (FIG. 3A) from the node of $V_{detected}$ (FIG. 1) in determining the low frequency node resistance, $R_{src}$, as shown in the resistance-frequency graph of FIG. 3B, where $R_{src}$ is about 106 ohms.

Referring back to FIG. 2A, depicted is a schematic block diagram of a data communications system having TRD capabilities. The data communications system shown in FIG. 2A may comprise a pulse generator 202, a TX (transmitter) pad 226 (TX node), a first network adapter 228, e.g., PCI Express (PCIe) card; a transmission line 230, e.g., coaxial cable, twisted pairs—CAT5, CAT6 Ethernet; a second network adapter 232, e.g., PCI Express (PCIe) card; and an RX (receiver) pad 234. The aforementioned modules all contribute to the communications path and round-trip reflected pulse time delay. The first network adapter 228 shows an open circuit (O.C.) at its signal output that is normally coupled to the transmission line 230.

Figure 1A:
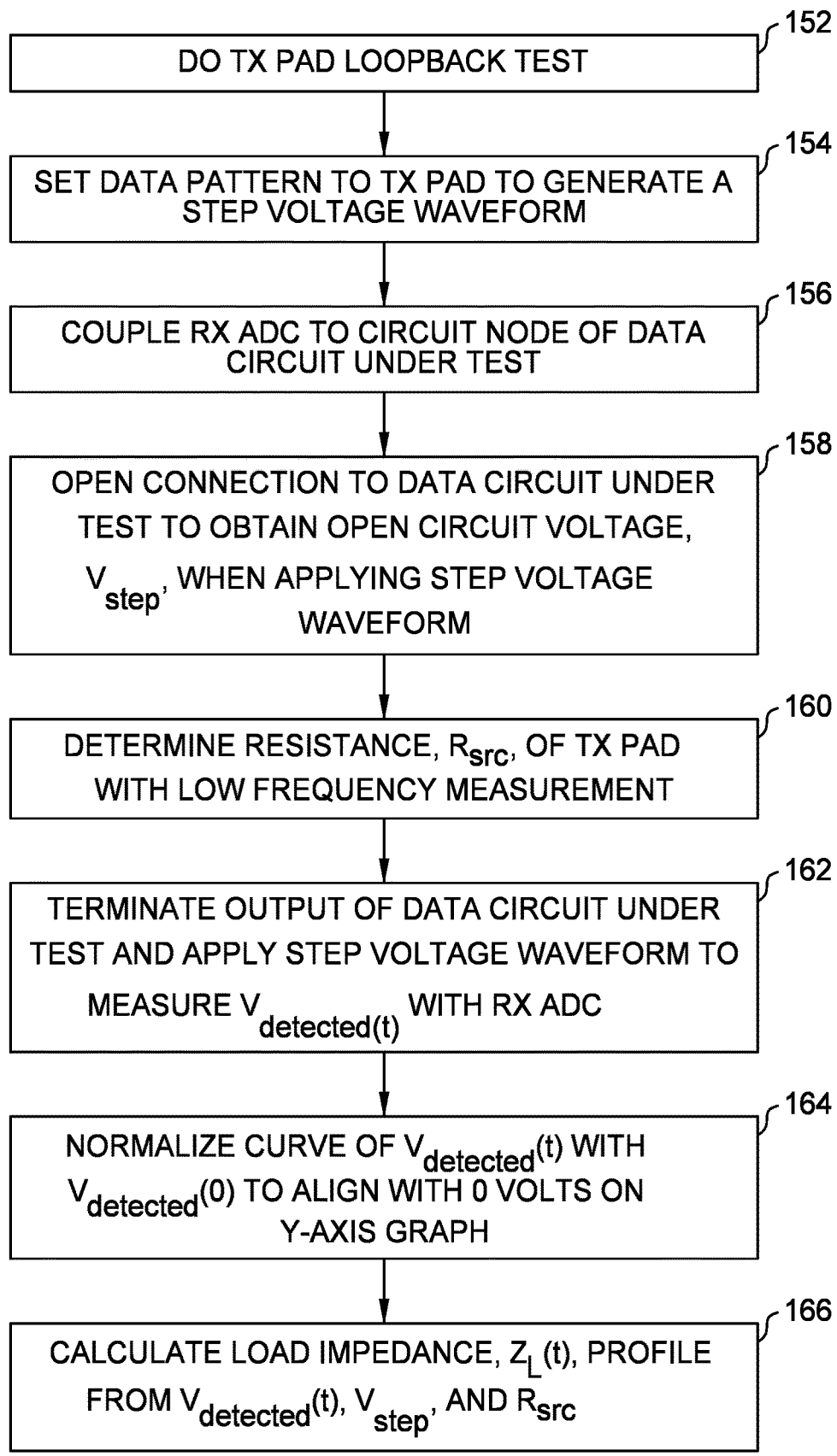
FIG. 1A illustrates a schematic process flow diagram for determining the characteristic load impedance of a communications circuit using an in-situ on-die TDR test procedure.

Procedure for Providing In-Situ On-Die TDR for Determining the Characteristic Load Impedance of a Communications Circuit Referring to FIG. 1A, depicted is a schematic flow diagram for determining the characteristic load impedance of a communications circuit using an in-situ on-die TDR test procedure. From this test procedure a load impedance over time may be plotted. The proposed procedure, described hereinafter, uses an in-situ on-die TDR provided by existing TX circuits normally used for operational data communications. Therefore, a circuit designer can verify if the on-die distributed circuit is providing impedance continuity, even all the way through the output of package, socket, or escape routing on a printed circuit board (PCB). The following step-by-step procedure may be used to obtain the TDR profile of a distributed circuit load impedance, $Z_L(t)$, using existing circuitry of the integrated circuit.

Figure 7A:
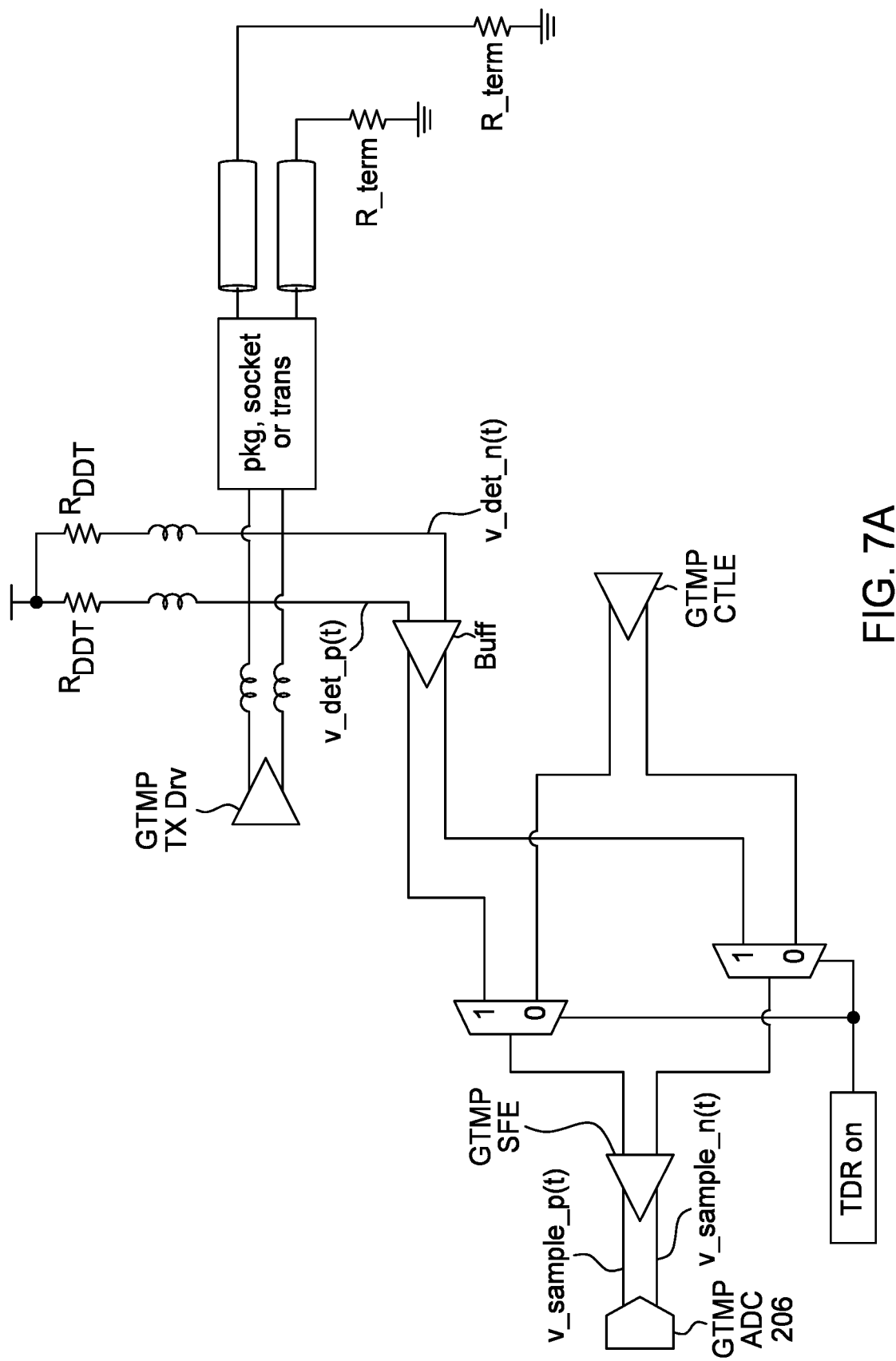
FIGS. 7A and 7B illustrate schematic block diagrams of two options for loop back testing of a TX signal using an RX ADC.
Figure 7B:
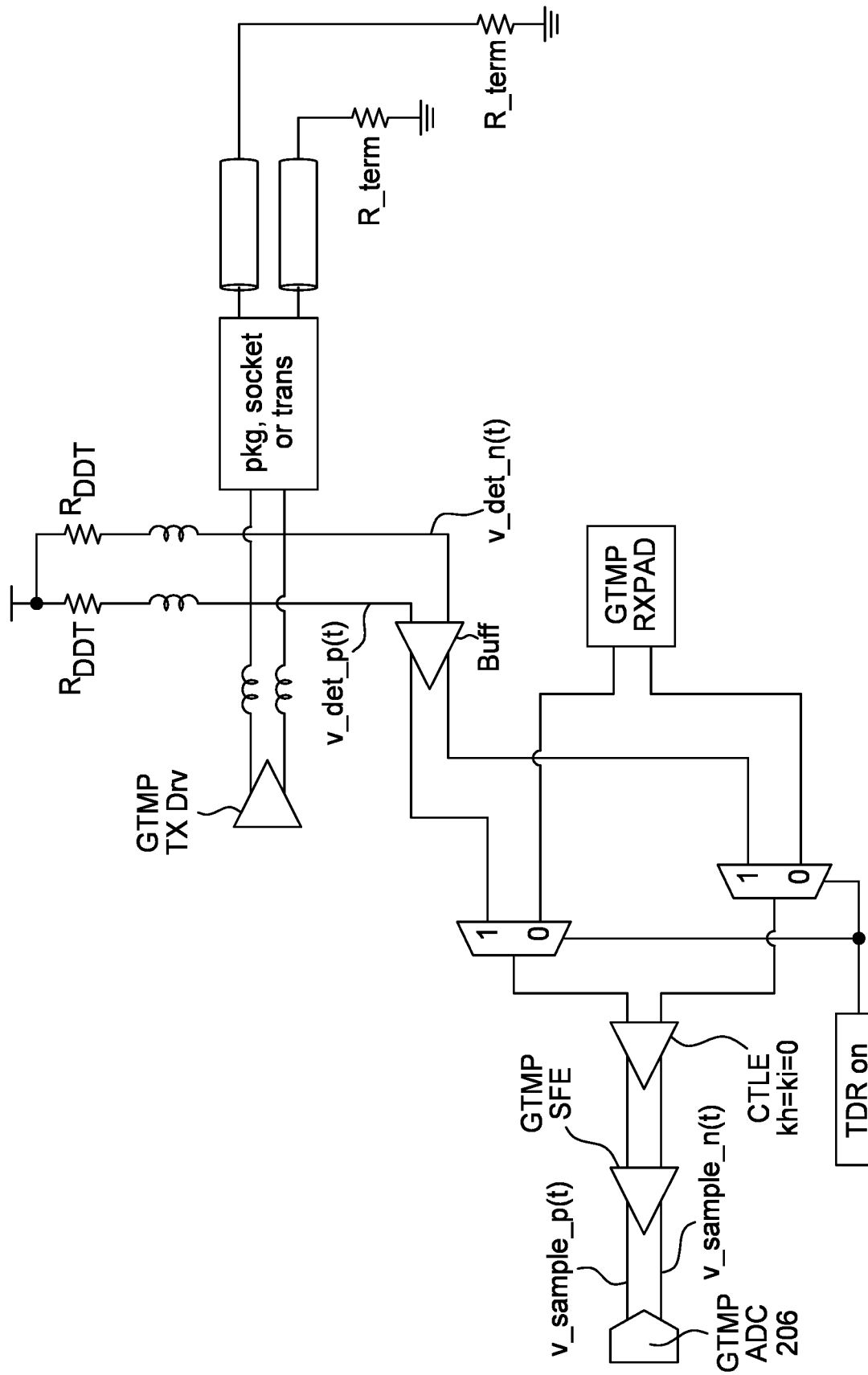

In step 152, determine that the TX pad circuitry is working properly. This may be accomplished by doing a transmitter loopback test as shown in FIGS. 7A and 7B and more fully described hereinafter.

In step 154, with all the adaptation code frozen, a data pattern is sent to the TX pad driver circuit for generating a step voltage with an appropriate swing to use in the TDR process. This data pattern may be 000 . . . 000111 . . . 111 to generate the TX voltage step waveform (FIG. 1).

In step 156, a voltage probe is coupled to a node from where the impedance continuity is to be explored. The voltage probe may be an existing integrated circuit analog-to-digital converter (ADC) associated with the analog front end (AFE) coupled to the RX pad of the integrated circuit.

In step 158, a transient simulation is run (or to configure the hardware) by opening a signal connection at the output of a package (FIG. 2A) to obtain the $V_{step}$ value as shown as FIG. 2B. Where $V_{step}$ is the maximum voltage swing of the $V_{detected}$ waveform into the open circuit, and measured by the ADC of the AFE coupled to the RX pad of the integrated circuit.

Figure 3A:
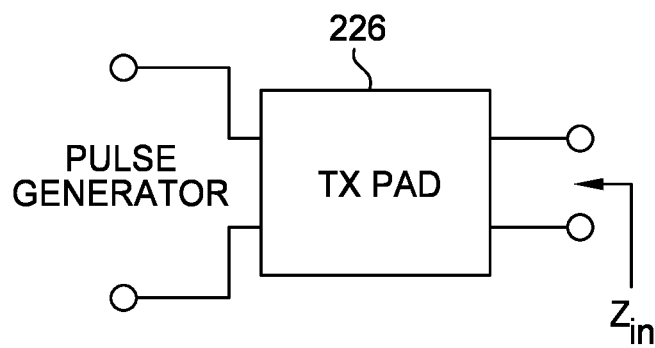
FIG. 3A illustrates a schematic block diagram of a test configuration for determining a real resistance part of a TX circuit.
Figure 3B:
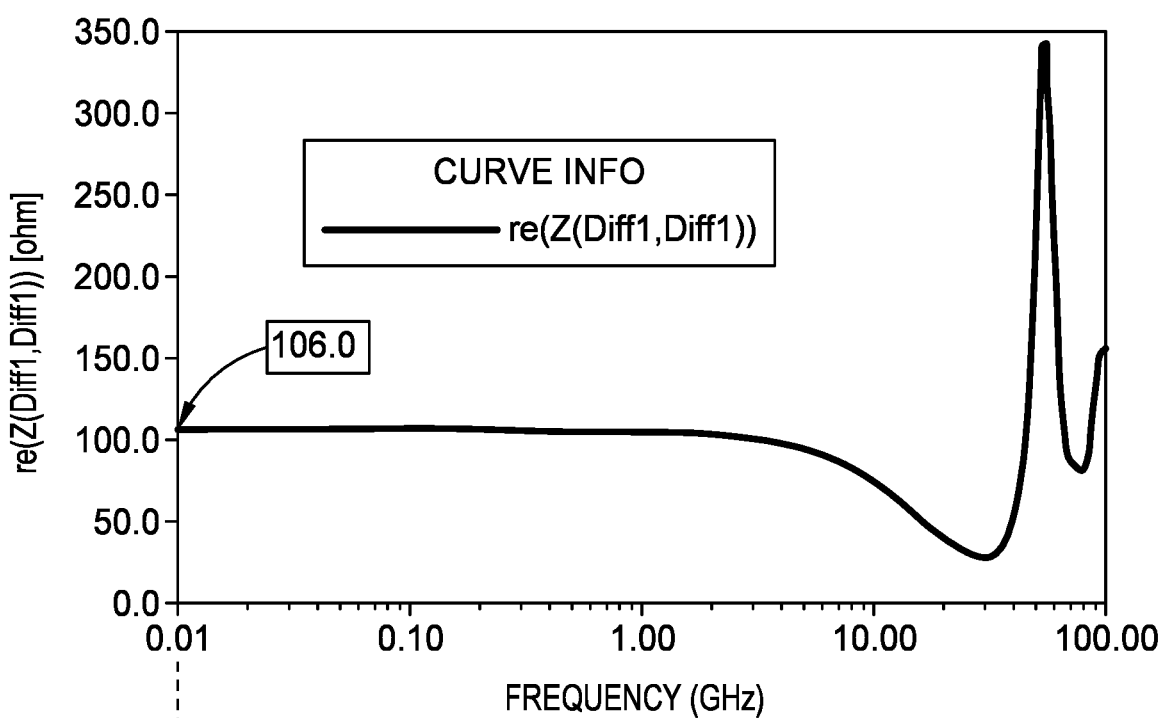
FIG. 3B illustrates a schematic resistance-frequency graph of the TX circuit shown in FIGS. 2A, 2B and 3A.

In step 160, the resistance, $R_{src}$, of the TX pad is determined by coupling an impedance measurement device operating at a low frequency to the TX pad, as depicted in FIGS. 3A and 3B.

Figure 4:
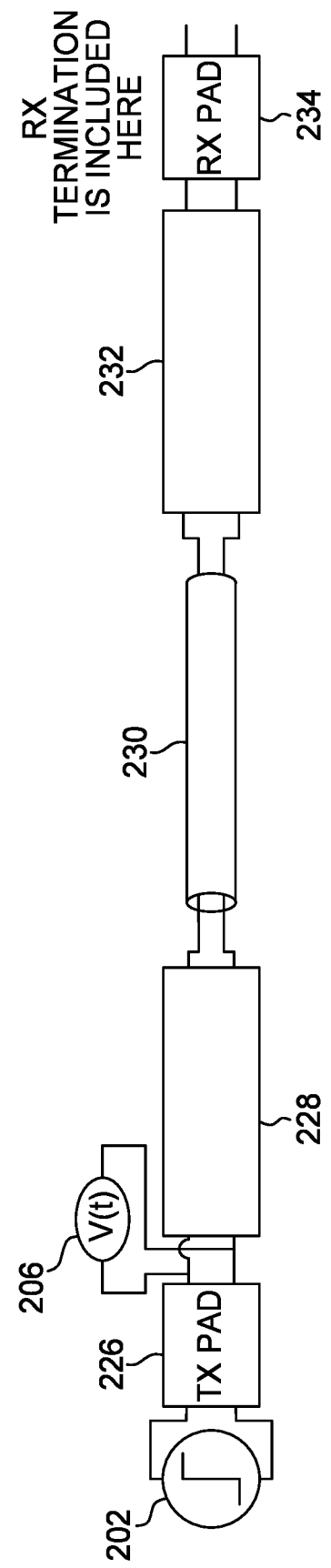
FIG. 4 illustrates a schematic block diagram of a TDR test-bench configuration for a channel under test.

In step 162, the output of the data circuit under test is terminated and a step voltage waveform is applied to the TX pad and a time dependent voltage, $V_{detected}(t)$, is measured with the RX ADC. Referring to FIG. 4, depicted is a schematic block diagram of a TDR test configuration for a data channel under test. A TX voltage step waveform (TDR pulse) is generated with a pulse generator 202 (TX driver output having a data pattern 000 . . . 000111 . . . 111). An ADC 206 measures the time dependent voltage, $V_{detected}(t)$, on the TX pad 226, while the TX voltage step waveform passes through a first network adapter 228, a transmission line 230, a second network adapter 232 and finally to the RX pad 234 at which a termination load is coupled thereto.

In step 164, the graph of $V_{detected}(t)$ may be normalized to align with the voltage value of $V_{detected}(0)$, at zero measurement time, to be zero (0) volts on the y-axis of the time/voltage graph of $V_{detected}(t)$.

Figure 5:
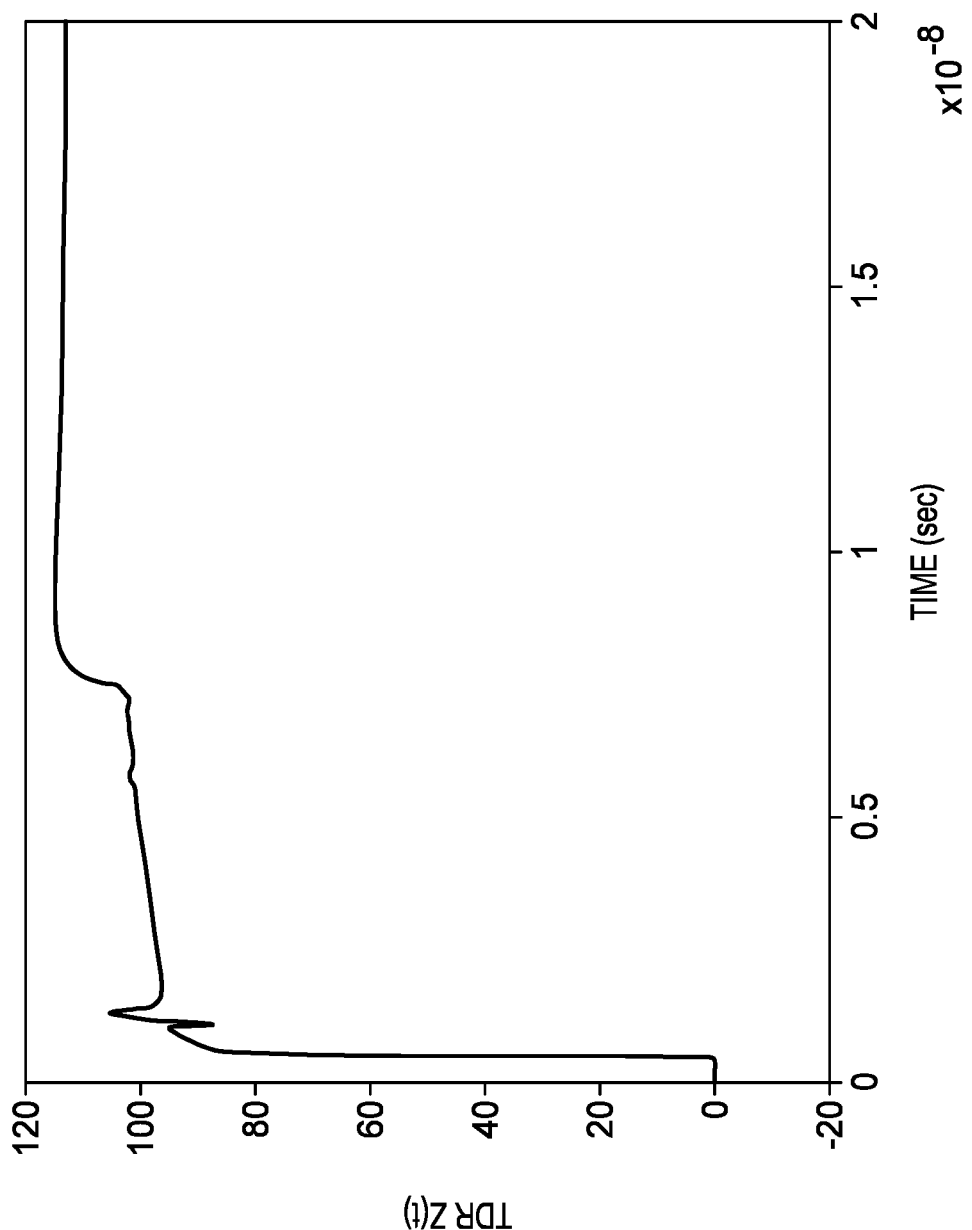
FIG. 5 illustrates a schematic resistance-frequency graph of a simulated TDR of the channel under test shown in FIG. 4.

In step 166, the resulting time dependent impedance $Z_L(t)$ may be calculated from Equation (2) above, and graphed as shown in FIG. 5.

In-Situ On-Die TDR for Electrical Verification

Figure 6A:
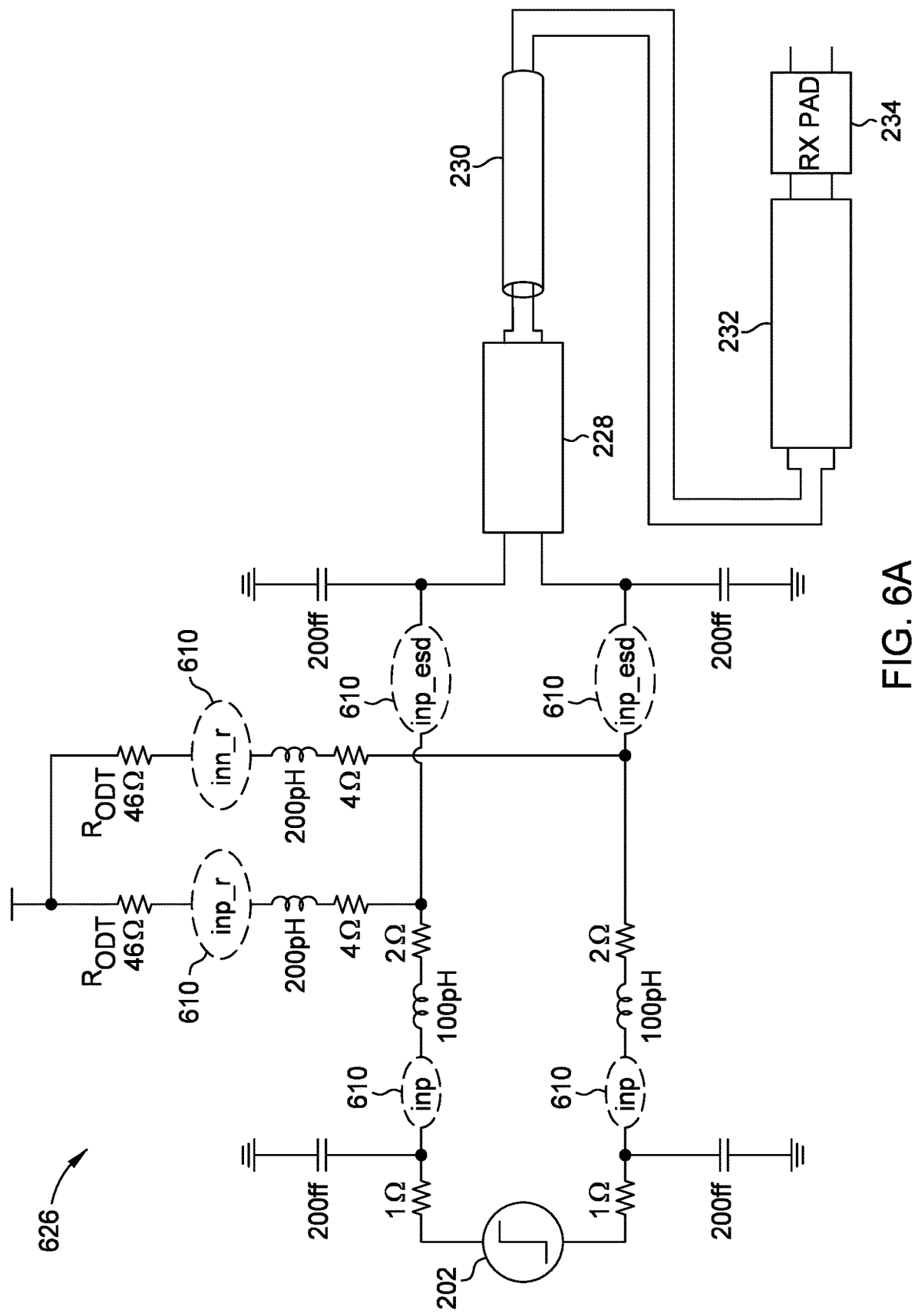
FIG. 6A illustrates a schematic circuit diagram of a TX side showing probing options with nodes.
Figure 6B:
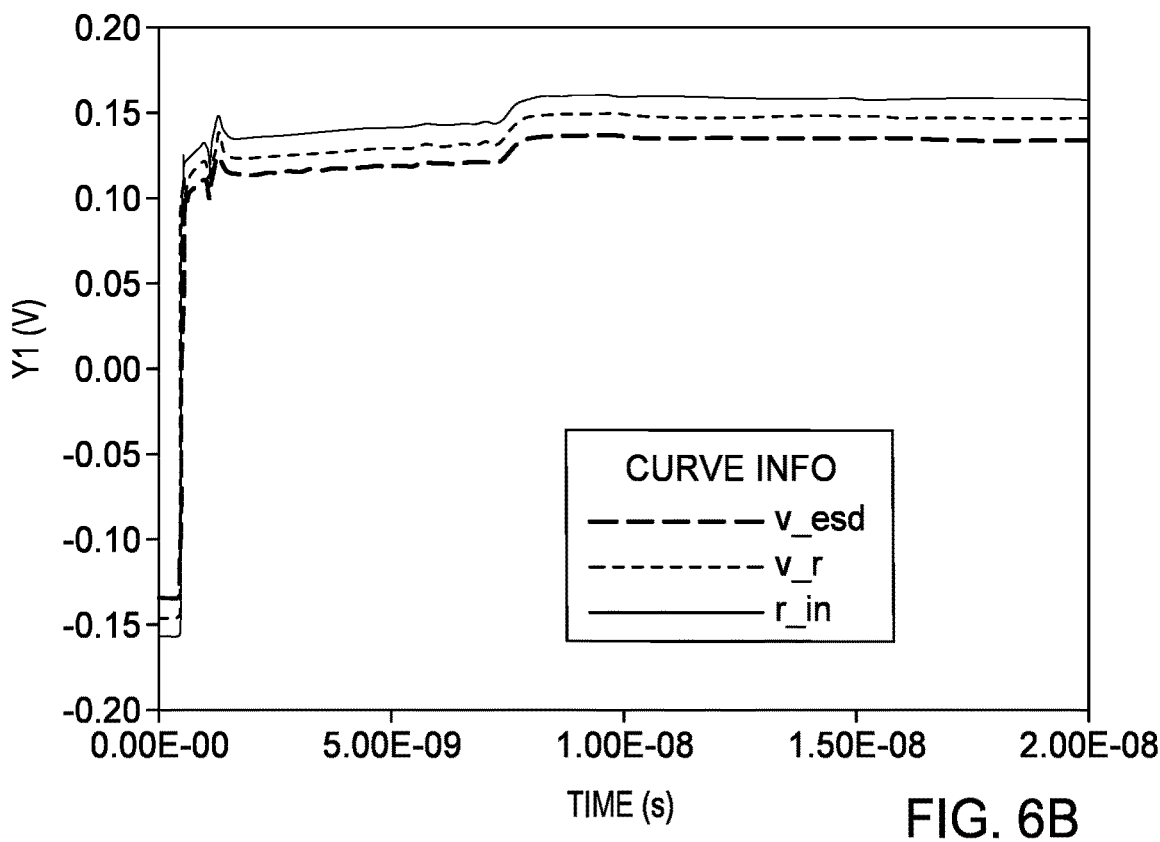
FIG. 6B illustrates voltage-time graphs of the probing options shown in FIG. 6A.
Figure 6C:
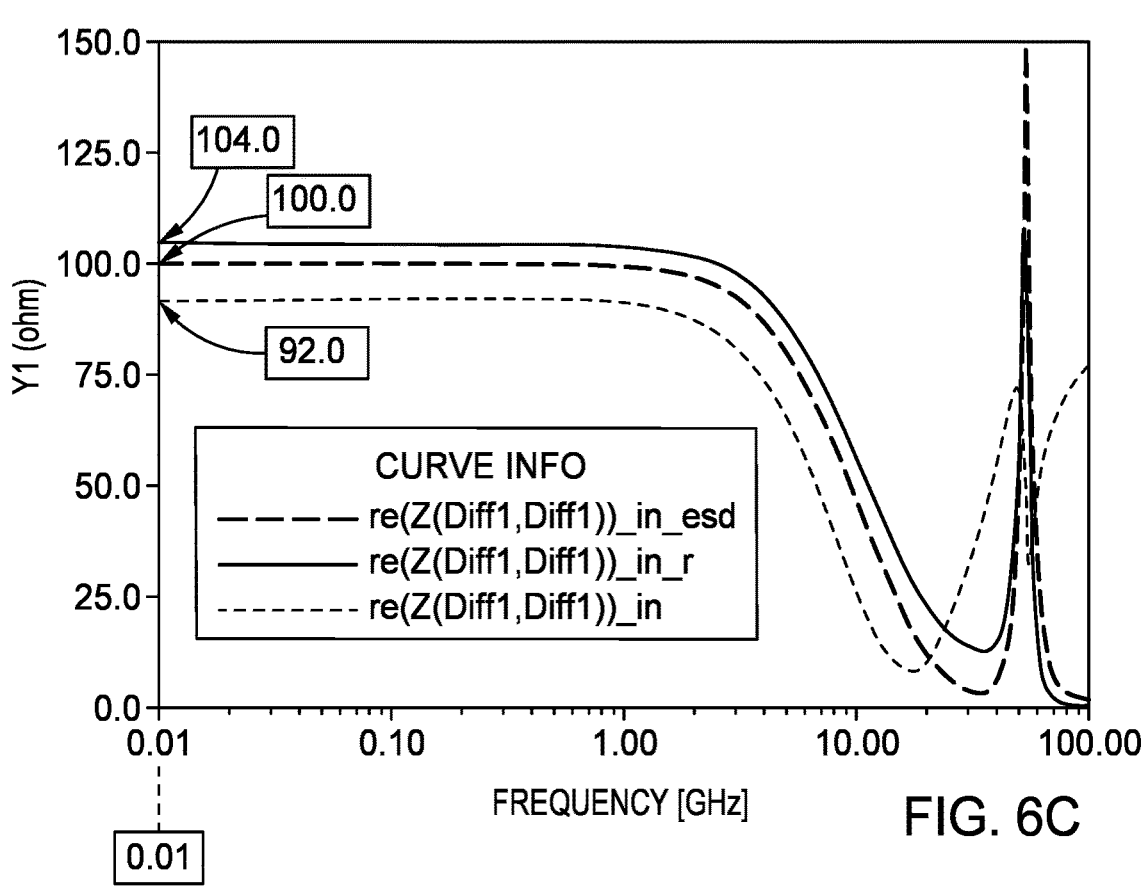
FIG. 6C illustrates impedance-time graphs of the probing options shown in FIG. 6A.

The concept of in-situ on-die TDR is also very helpful when doing electrical verification of system hardware after being manufactured, e.g., in high volume, and/or commissioned after installation. Unlike the simulation which allows the infinite small oversampling time step and infinite voltage resolution, the best that in-situ on-die TDR can offer in existing hardware testing is a user interface (UI) sampling at 6-bit or 7-bit voltage resolution, especially considering making use of an existing SAR ADC implemented for SerDes transceivers. Nevertheless, there are still a few configurations shown as follows to probe (at the TX side) and sample (at the RX side) the TDR step waveform. To probe the waveform at the TX side, assuming a circuit topology having a coil and ESD diode as shown in FIG. 6A, the probing options are shown as those nodes encircled with dashed lines represented by numeral 610. Although the node named "in_esd" looks the most reasonable one to be probed, the simulated step waveforms in FIG. 6B shows that the swings are the main difference between them. Using equation (2) to obtain the Z(t) profile, the $R_{src}$ value of these 3 options are also different as shown in the FIG. 6C.

To sample the waveform at the RX side, the preferred sampling point will be determined by the clocked ADC. The way of detected (probing) a signal being routed to the ADC taking the waveform samples can be quite different depending on the choice of analog front-end circuit design. For example, there are two options are shown in FIGS. 7A and 7B to direct the signal from a probing node to a sampling node by using a data multiplexer.

In this application, due to the high data rate, it is difficult to directly sample the detecting node. Therefore, a post-layout simulation may be needed to extract the transfer function between probing node (v_det(t)) and sampling (v_sample(t)) node such that a de-embedding operation can be applied on the sampled waveform to derive the correspondent probing waveform. This explains the reason why zero codes are proposed in the diagram shown in FIG. 7B since a simpler de-embedded operation is expected if there is no frequency boosting introduced when directing the signal from probing node to sampling node. In addition, $R_{src}$ may also be predicted by the simulation. Fortunately, if the TXPAD model is provided, then a quick simulation for determining $R_{src}$ can be done as shown in FIG. 3A.

Figure 8A:
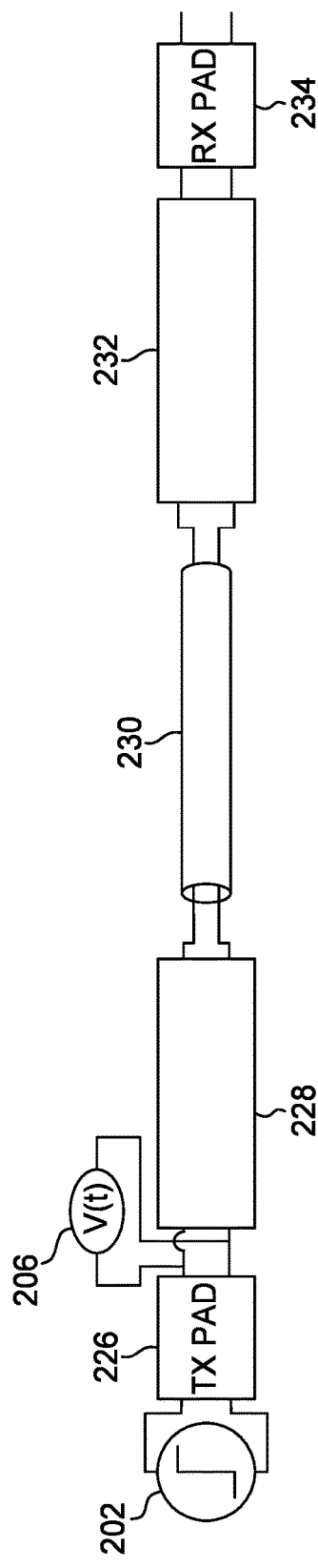
FIG. 8A illustrates a schematic block circuit diagram for de-embedding a probing waveform using an RX ADC.
Figure 8B:
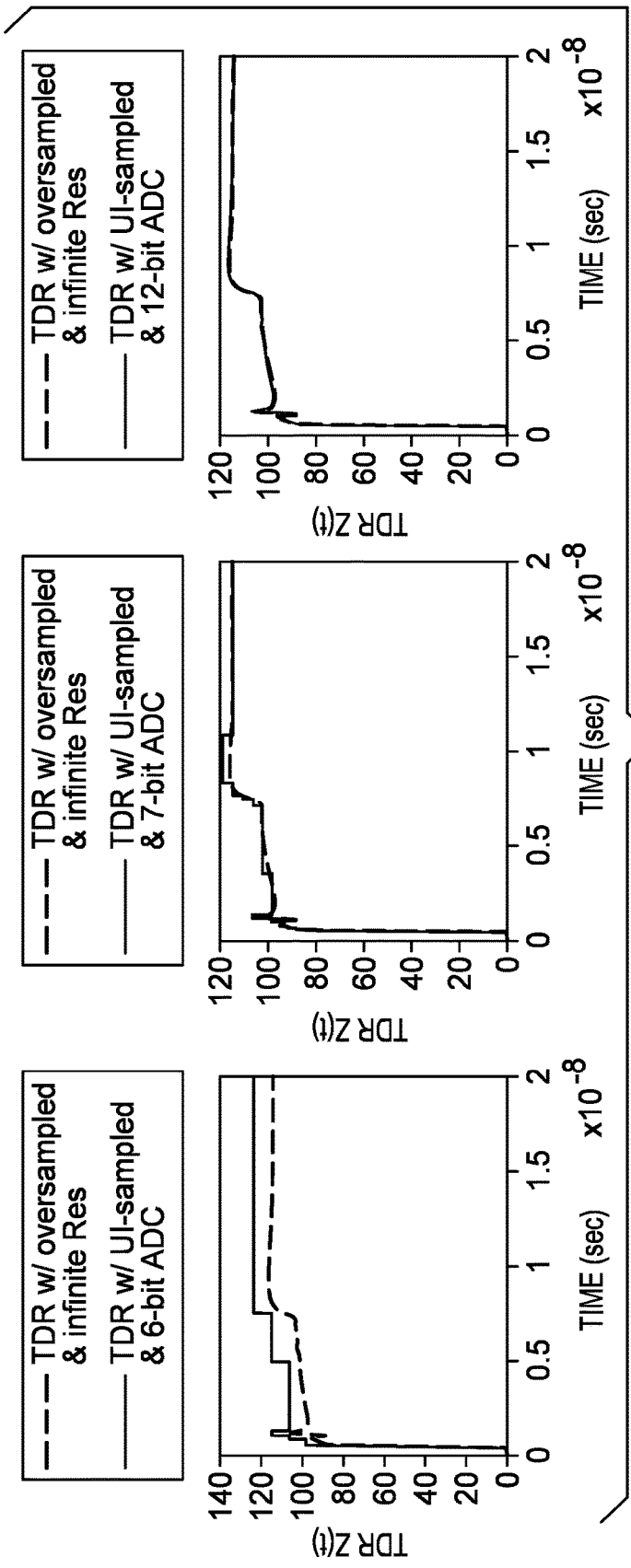
FIG. 8B illustrates impedance-time waveforms when using different ADC bit resolutions.
Figure 9A:
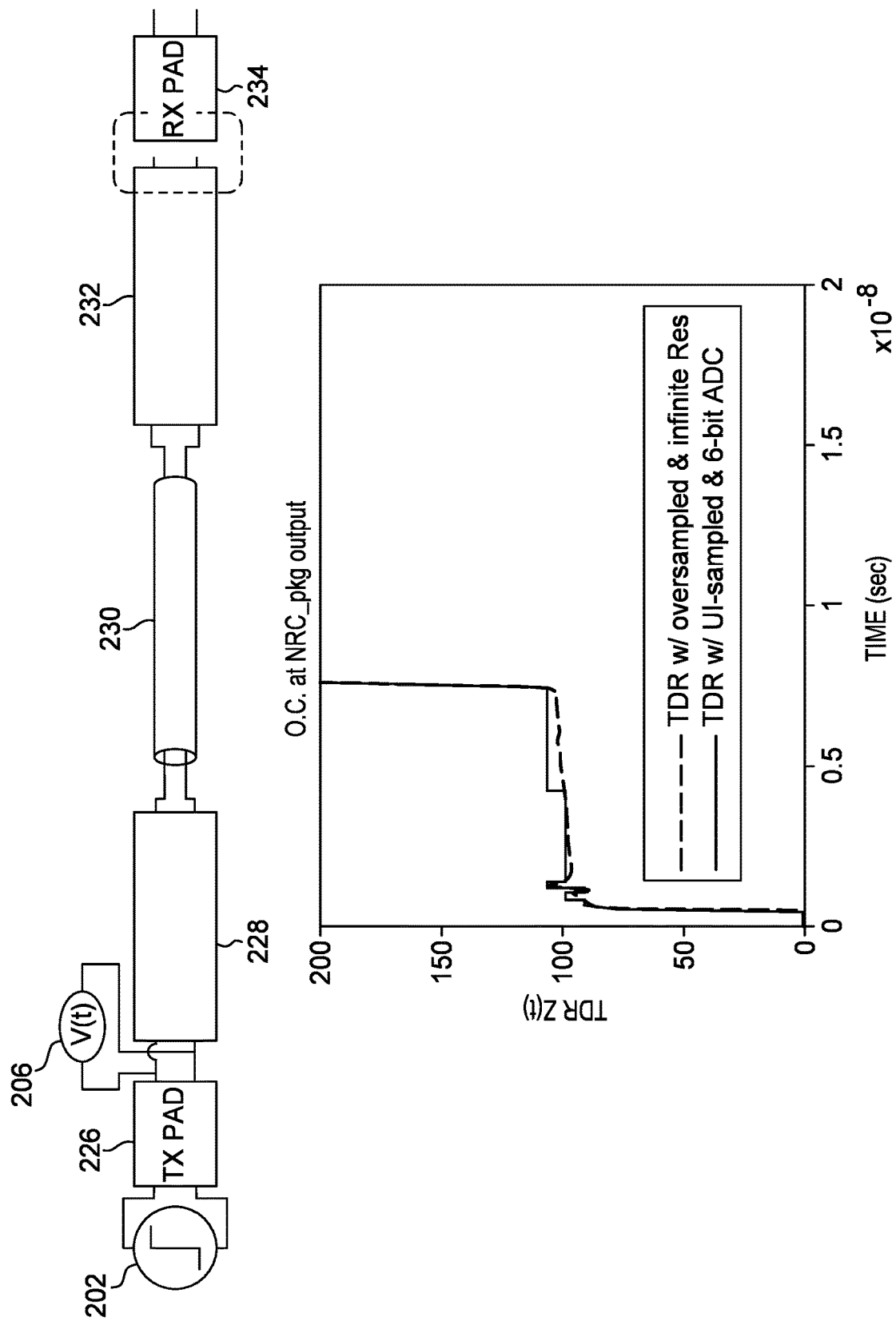
FIGS. 9A-9D illustrate the TDR profile using a standard SerDes RX ADC for sampling the step waveforms of an open circuit at the RX pad, a short circuit at the RX pad, an open circuit just after the TX pad, and a short circuit just after the TX pad.
Figure 9B:
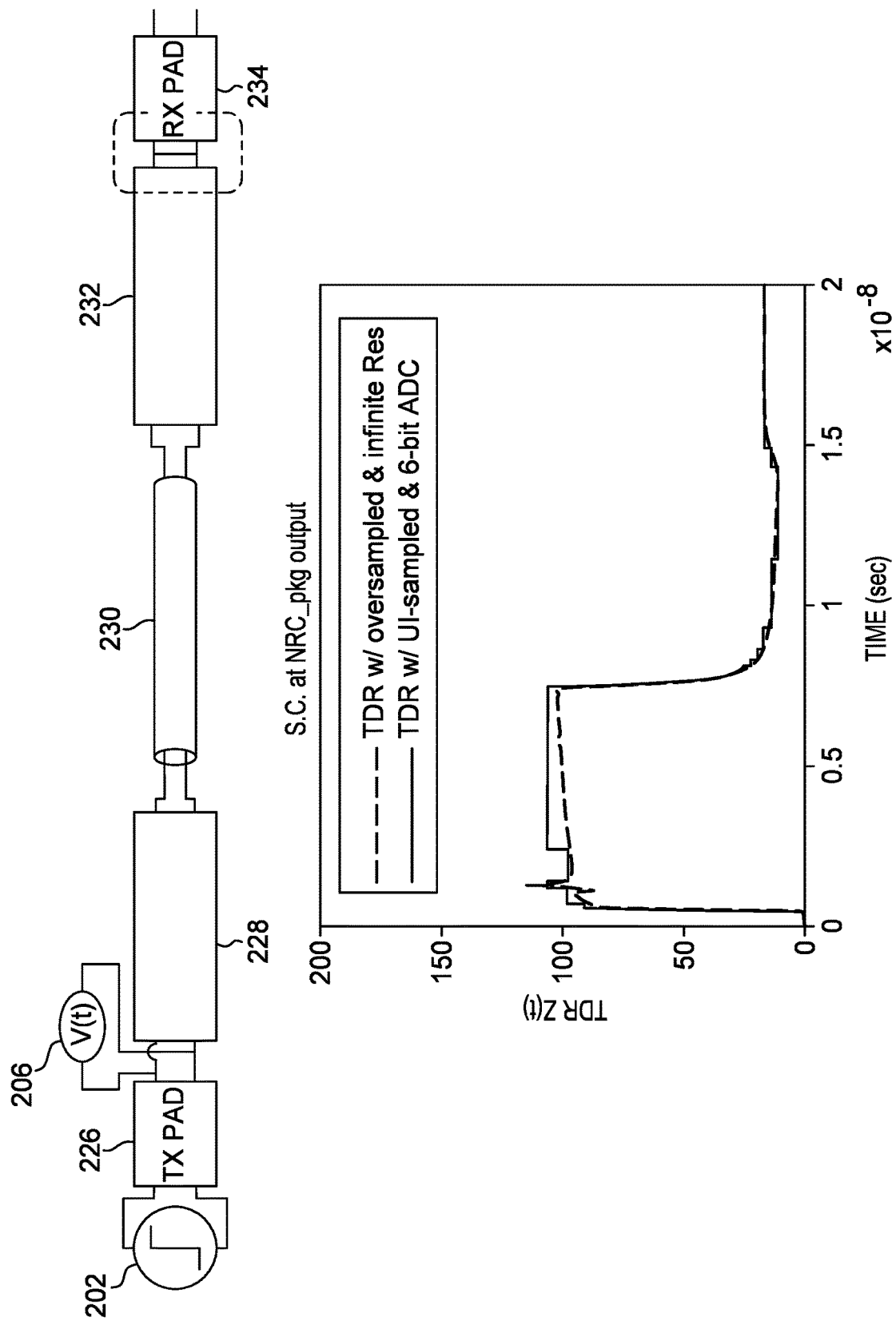
Figure 9C:
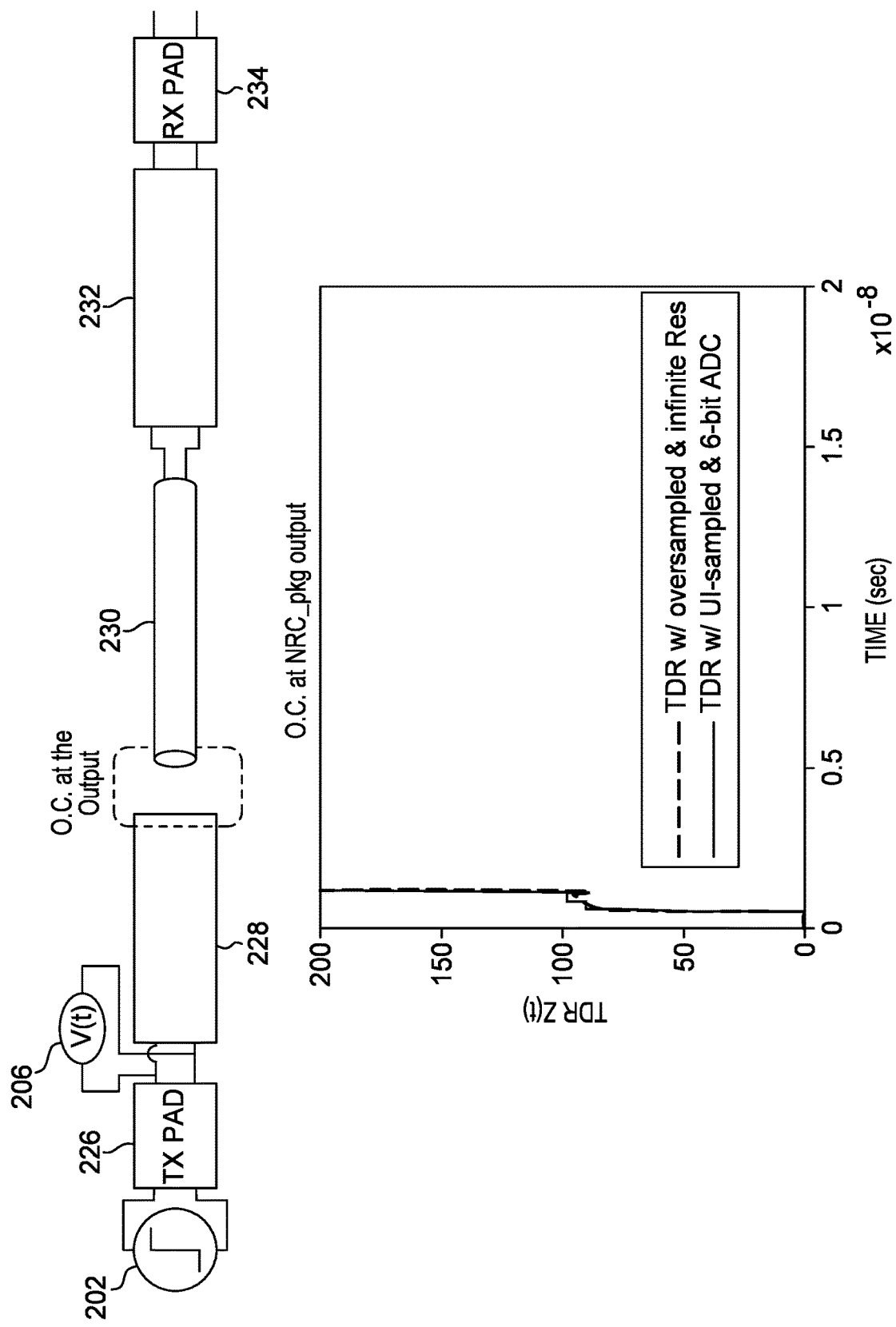
Figure 9D:
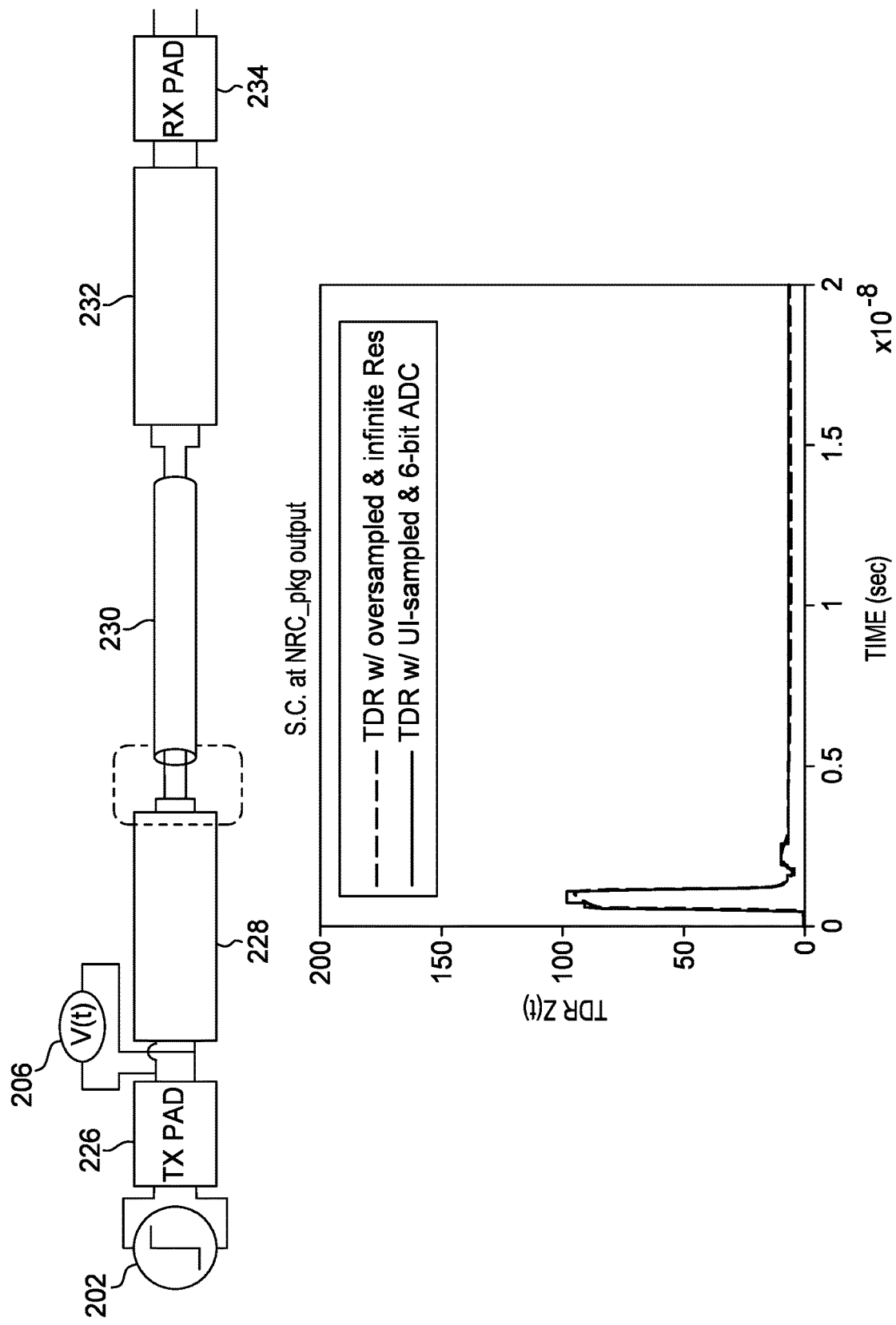

Although the ADC-sampled waveform can be de-embedded to obtain the probing waveform, this waveform may be sampled in a UI period and with its amplitude quantized into the ADC-bit resolution, using the circuit shown in FIG. 8A. Nevertheless, equation (2) can also be used to calculate the quantized impedance profile (i.e., $Z_{quantized}(t)$). Assuming that the previously mentioned de-embedded issue had been resolved, FIG. 8B shows the UI-sampled and quantized impedance profiles when using different ADC bit resolutions. The results show that 12-bit ADC will be able to closely track the UI-sampled impedance profile whereas existing ADC resolution (e.g., one 6-bit or 7-bit ADC) can only roughly capture the impedance with a certain level of quantization error.

Although using an existing ADC implemented for high-speed SerDes will incur a certain level of unpredictable impedance due to the limited bit resolution of its ADC, from an electrical verification perspective, it is still more than enough to detect if the channel has an open or short circuit at a specific location. The FIGS. 9A-9D show the TDR profile using a standard SerDes RX ADC for sampling the step waveform with the scenarios of an open circuit at the RX pad (FIG. 9A) or open circuit just after the TX pad (FIG. 9C), and a short circuit at the RX pad (FIG. 9B) or short circuit just after the TX pad (FIG. 9D) intentionally created for different exemplary locations in the data channel.

It is contemplated and within the scope of this disclosure that a transmission line 230 may be configured to be differential or single ended. Coaxial transmission lines, single or differential (two inner conductors), or twisted-pair cable, e.g., Ethernet cable CAT5 or CAT6 may be utilized. The following are examples of In-Situ On-Die TDR testing examples for both differential and single ended data transmission circuits having various open and short circuit configurations.

Figure 10A:
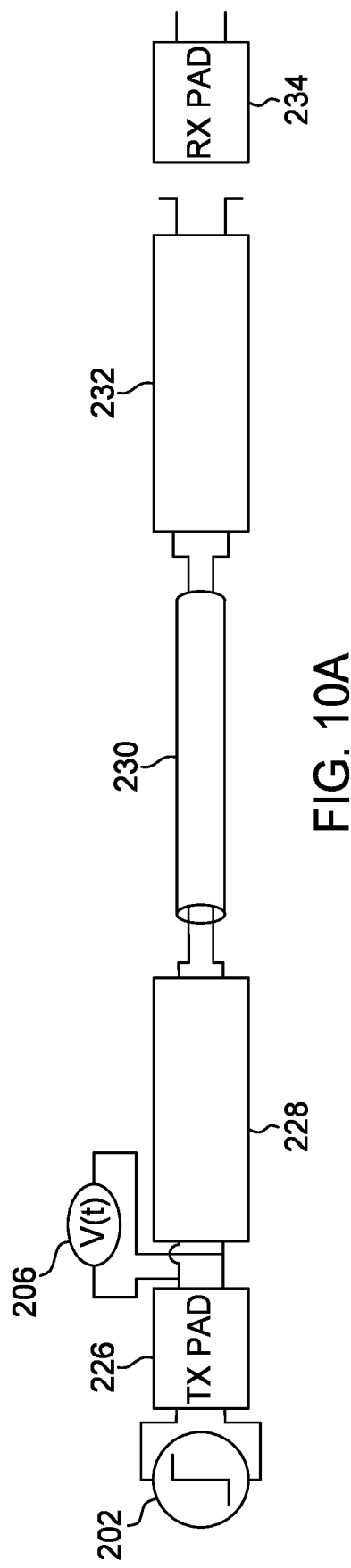
FIG. 10A illustrates a differential data transmission configuration with both inverted and non-inverted signal lines open at the RX pad.
Figure 10B:
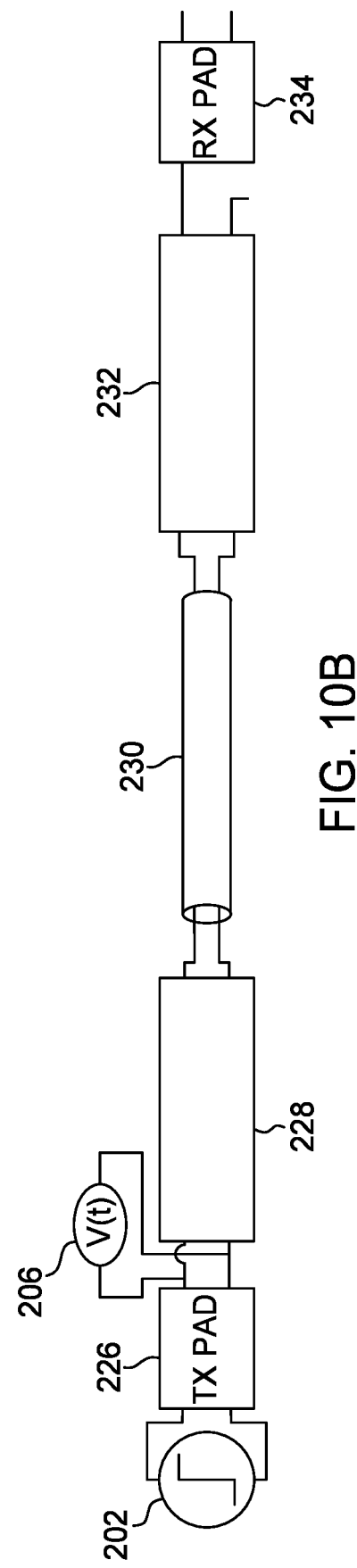
FIG. 10B illustrates a differential data transmission configuration with one of the signal lines open and the other connected to the RX pad.
Figure 11:
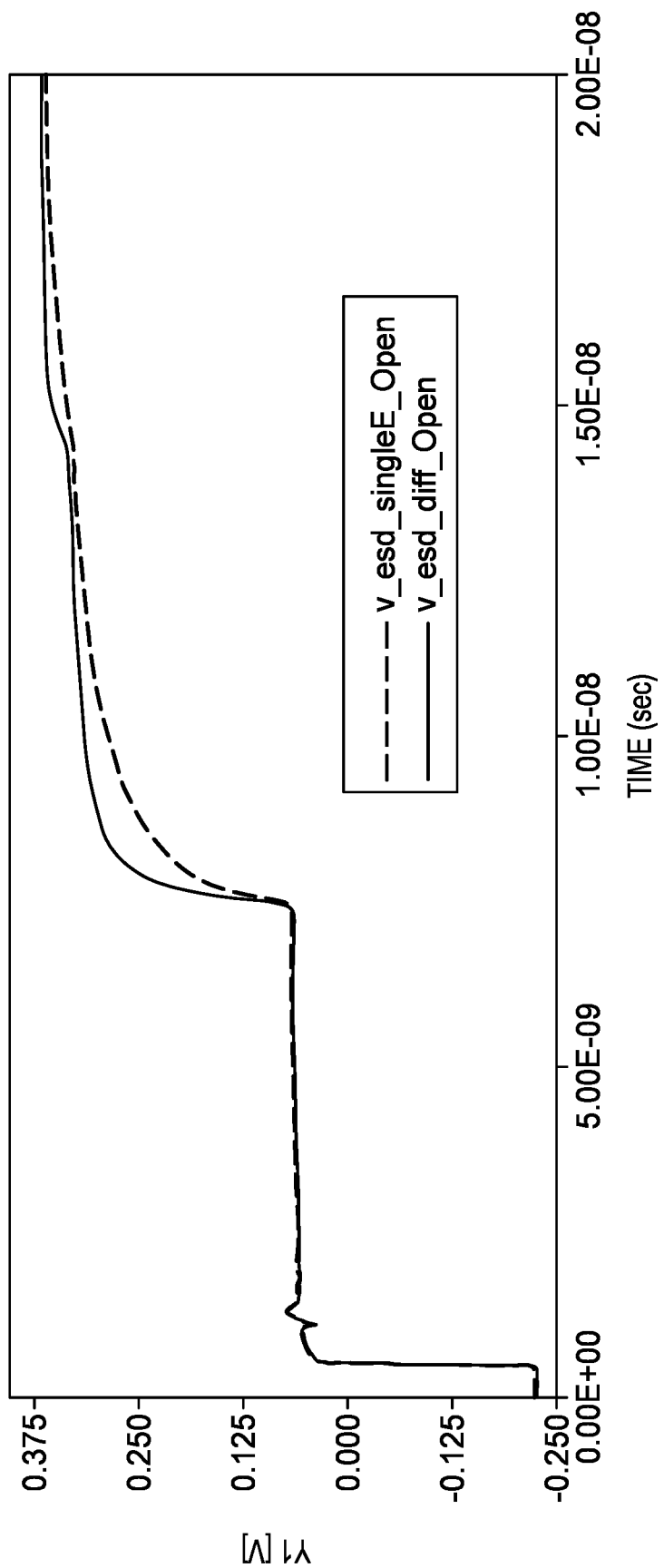
FIG. 11 illustrates the voltage/time waveforms when single ended and differential transmission line terminations are open.
Figure 12A:
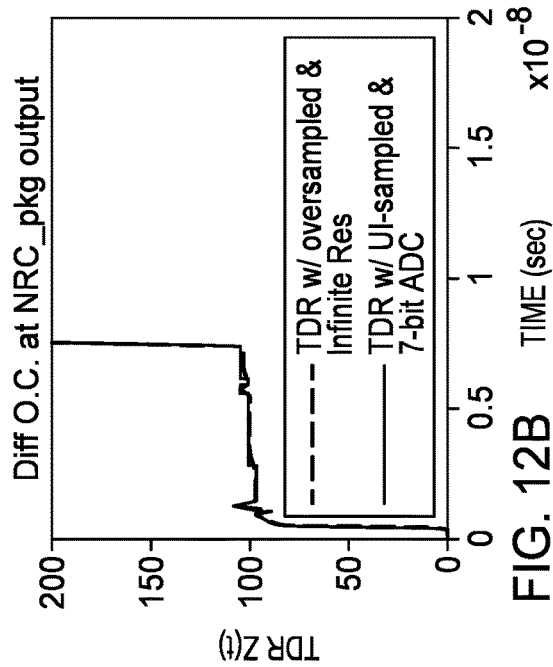
FIGS. 12A-12D illustrate the voltage/time waveforms and TX pad impedances when single ended and differential transmission line terminations are open.
Figure 12B:
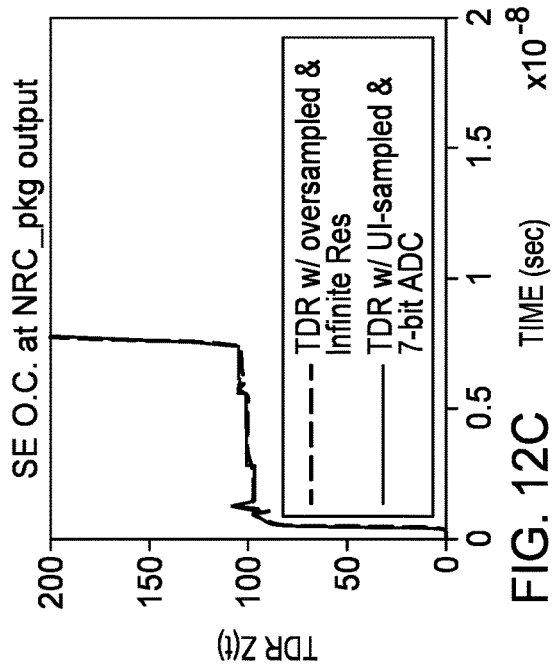
Figure 12D:
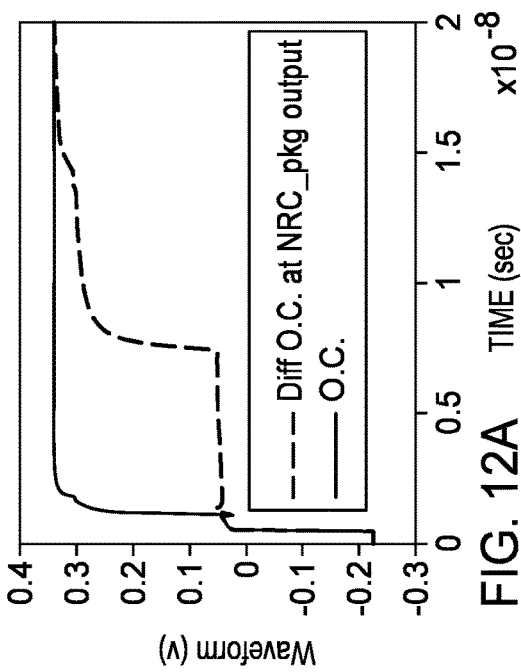
Figure 12C:
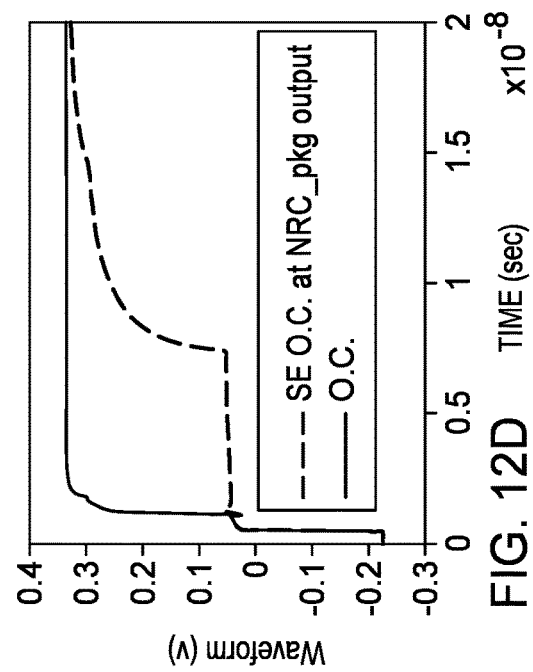
Figure 13:
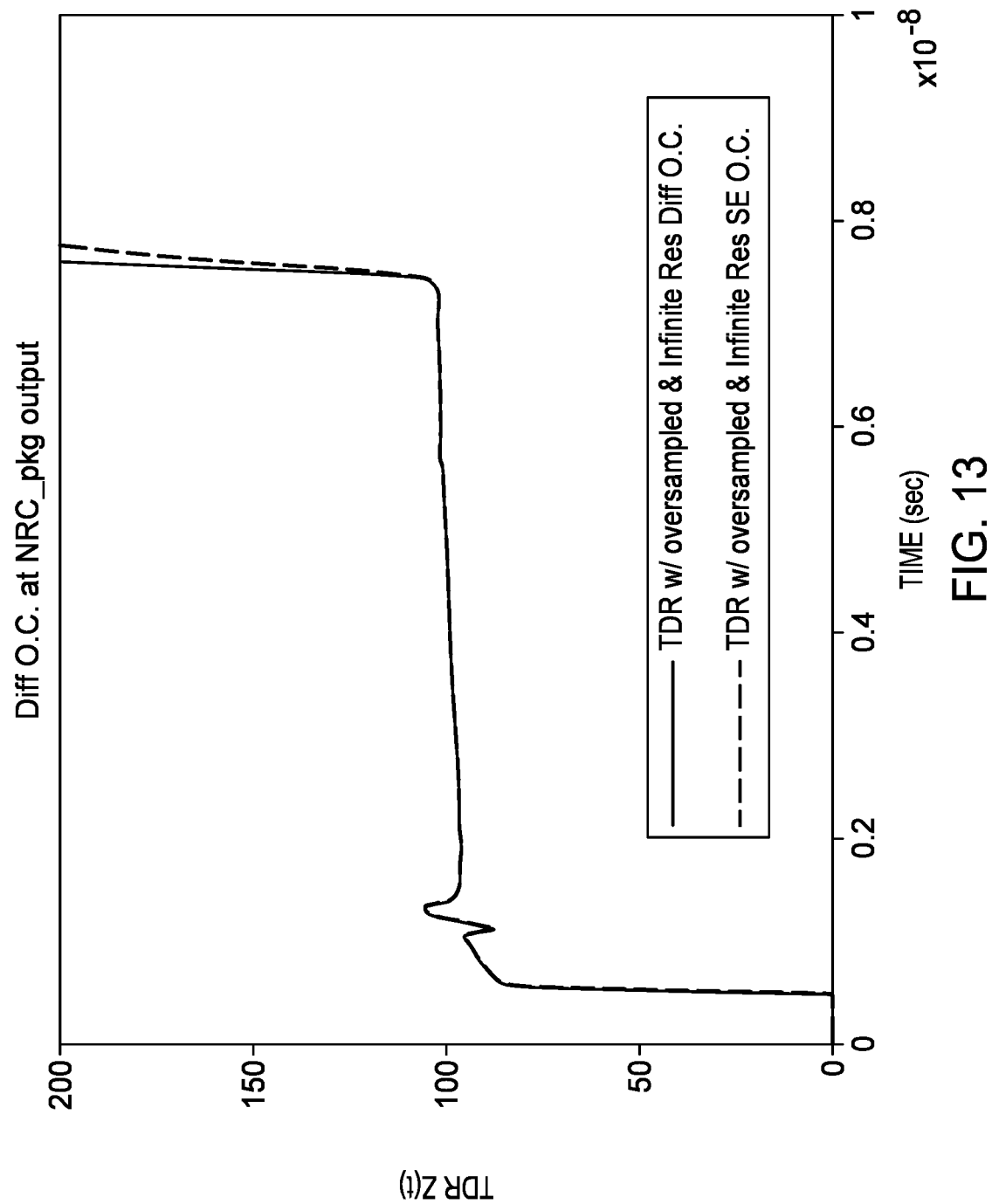
FIG. 13 illustrates the TX pad impedances when single ended and differential transmission line terminations are open.

FIG. 10A shows a differential data transmission configuration with both inverted and non-inverted signal lines open at the RX pad. FIG. 10B shows a differential data transmission configuration with one of the signal lines open and the other connected to the RX pad. FIG. 11 shows the voltage/time waveforms when single ended and differential transmission line terminations are open. FIGS. 12A-12D show the voltage/time waveforms and TX pad impedances when single ended and differential transmission line terminations are open. FIG. 13 shows the TX pad impedances when single ended and differential transmission line terminations are open.

Figure 14A:
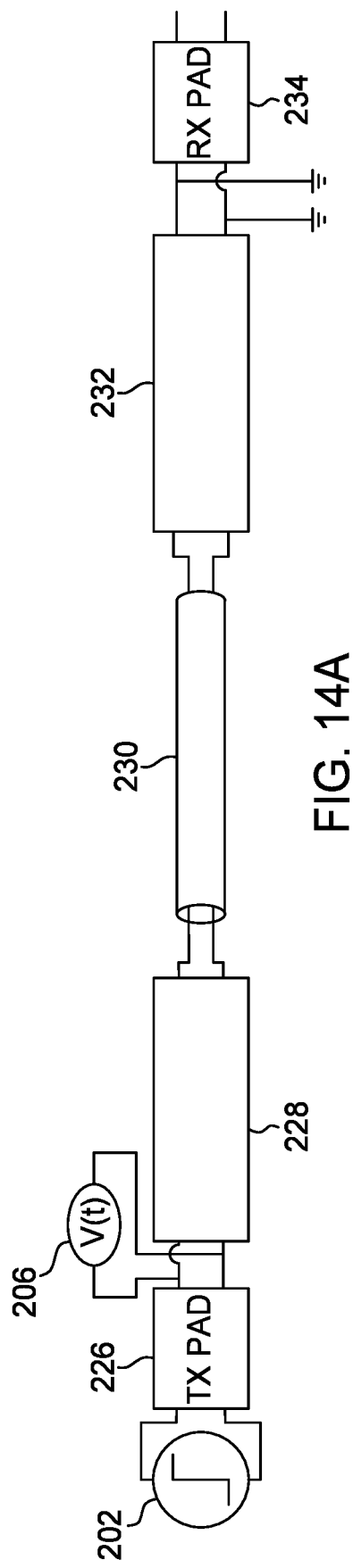
FIG. 14A illustrates a differential data transmission configuration with both inverted and non-inverted signal lines are shorted to ground at the RX pad.
Figure 14B:
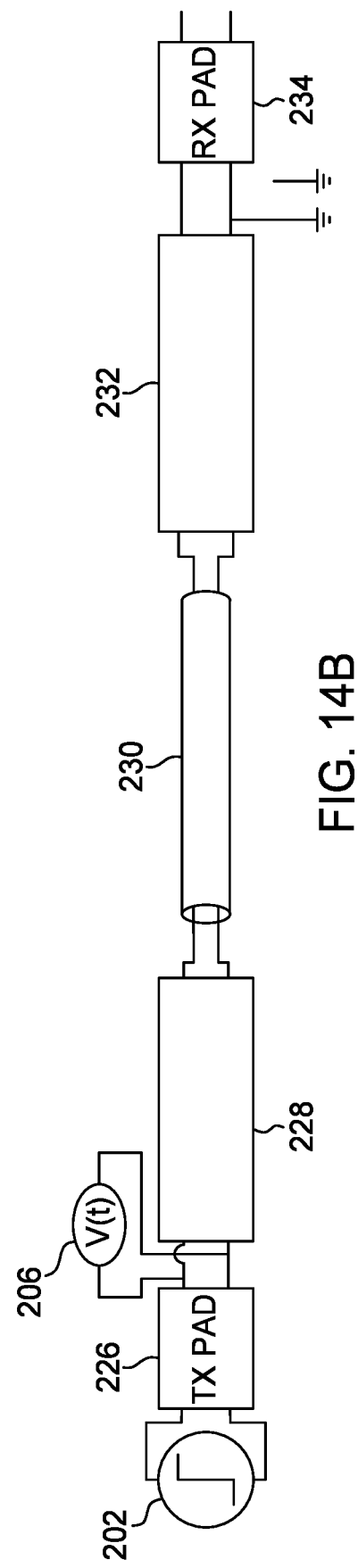
FIG. 14B illustrates a differential data transmission configuration with one of the signal lines shorted to ground and the other connected to the RX pad.
Figure 15:
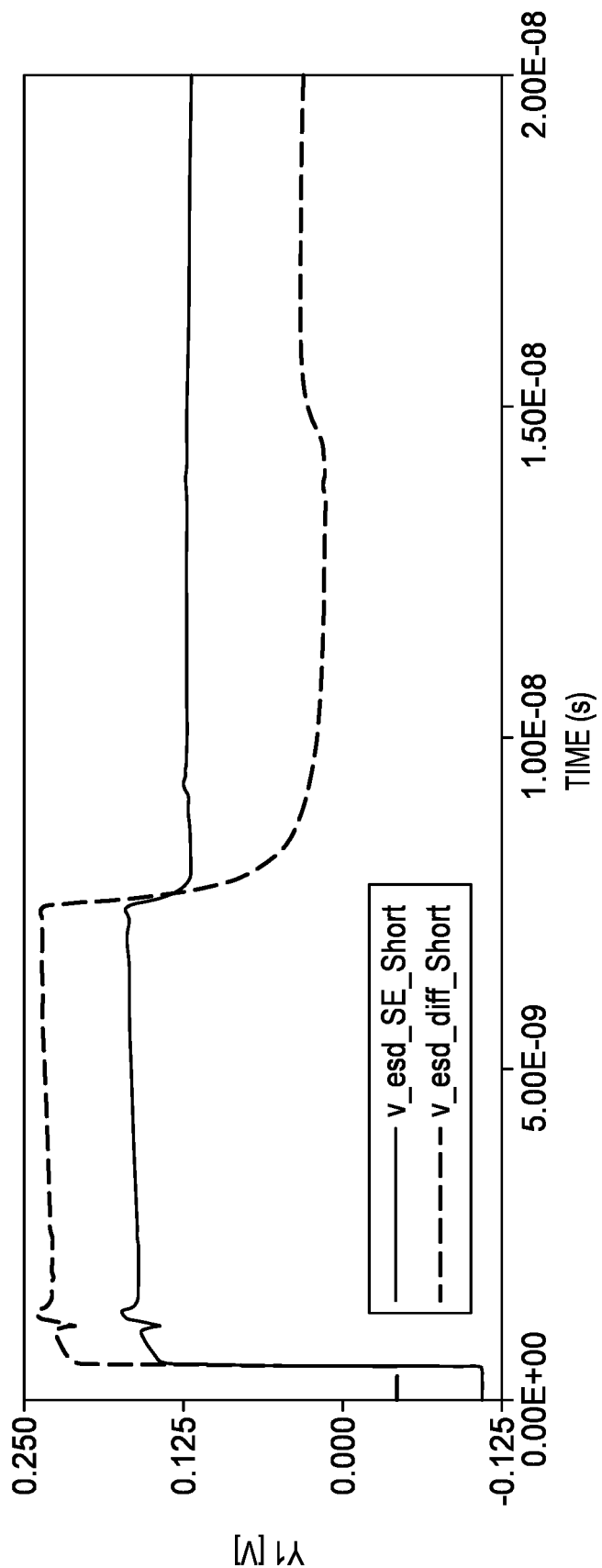
FIG. 15 illustrates the voltage/time waveforms when single ended and differential transmission line terminations are shorted to ground.
Figure 16A:
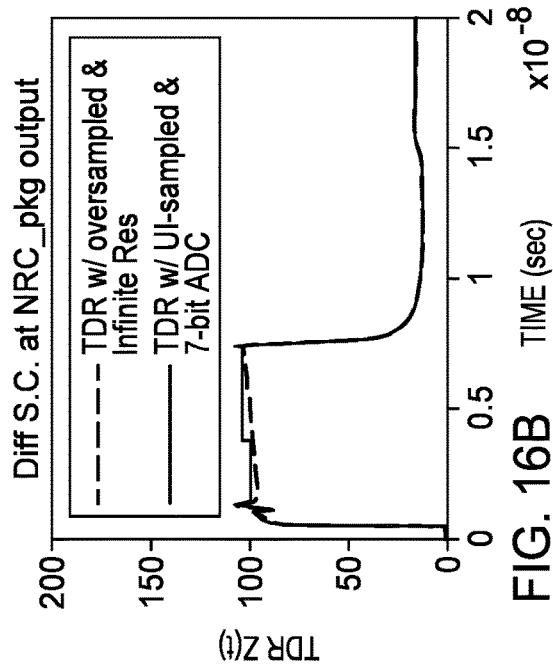
FIGS. 16A-16D illustrate the voltage/time waveforms and TX pad impedances when single ended and differential transmission line terminations are shorted to ground.
Figure 16B:
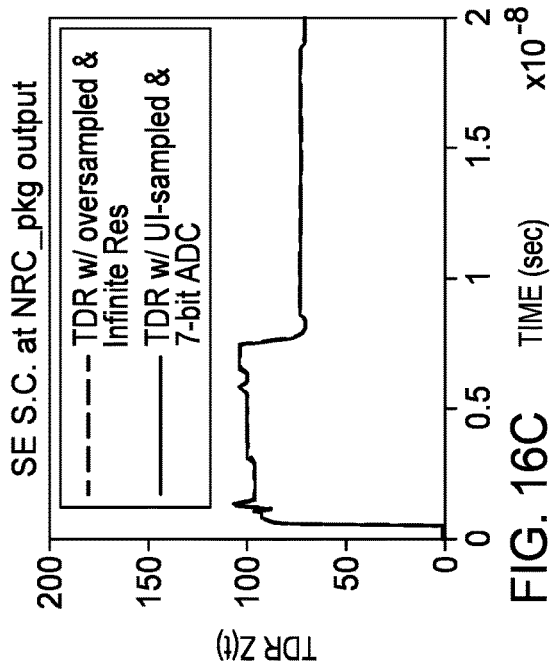
Figure 16D:
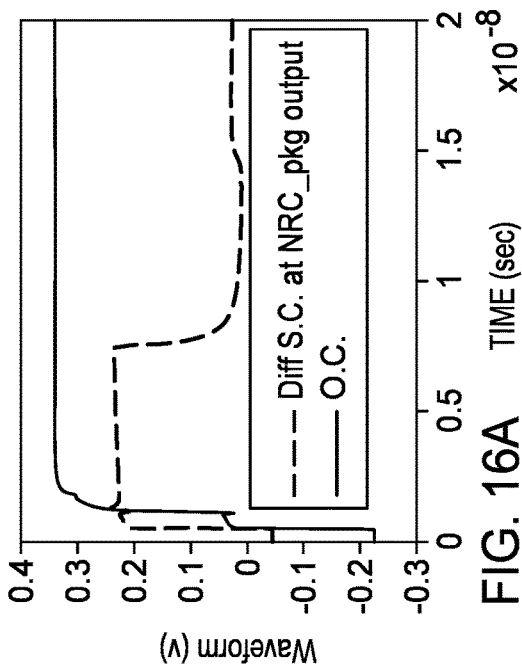
Figure 16C:
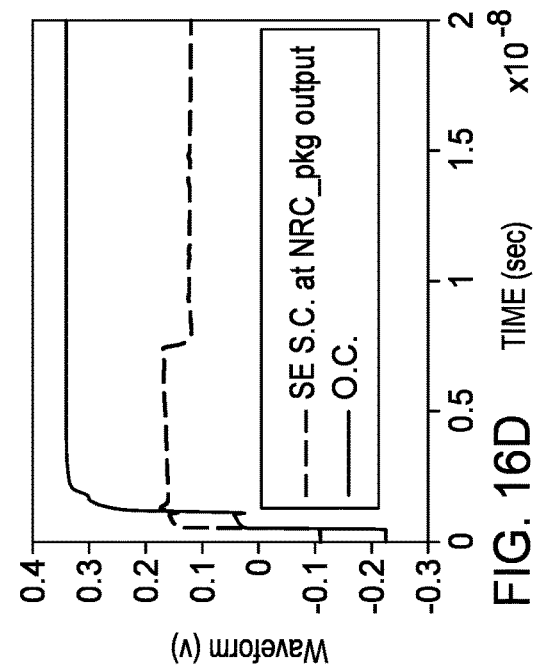
Figure 17:
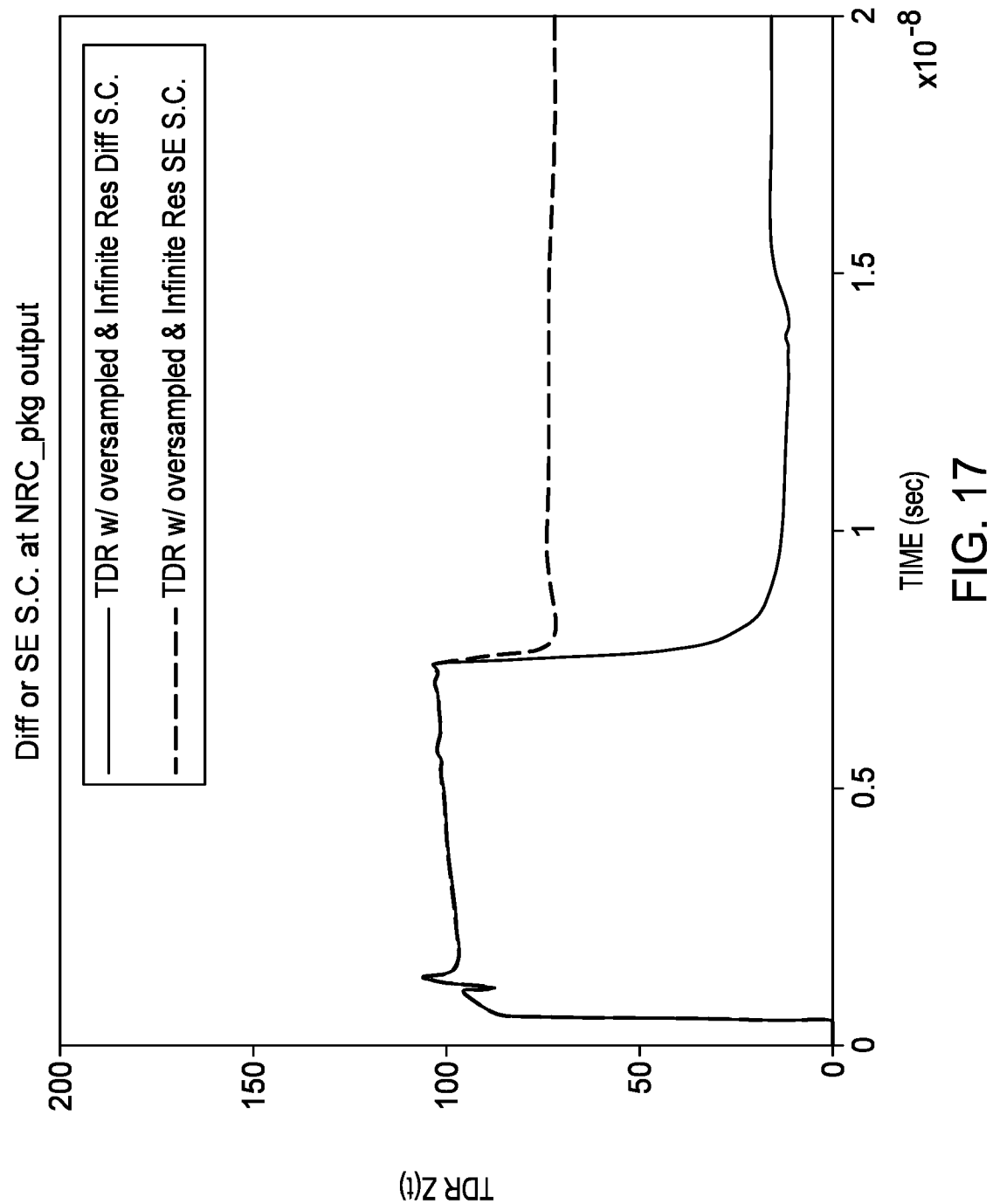
FIG. 17 illustrates the TX pad impedances when single ended and differential transmission line terminations are shorted to ground.

FIG. 14A shows a differential data transmission configuration with both inverted and non-inverted signal lines are shorted to ground at the RX pad. FIG. 14B shows a differential data transmission configuration with one of the signal lines shorted to ground and the other connected to the RX pad. FIG. 15 shows the voltage/time waveforms when single ended and differential transmission line terminations are shorted to ground. FIGS. 16A-16D show the voltage/time waveforms and TX pad impedances when single ended and differential transmission line terminations are shorted to ground. FIG. 17 shows the TX pad impedances when single ended and differential transmission line terminations are shorted to ground.

Figure 18:
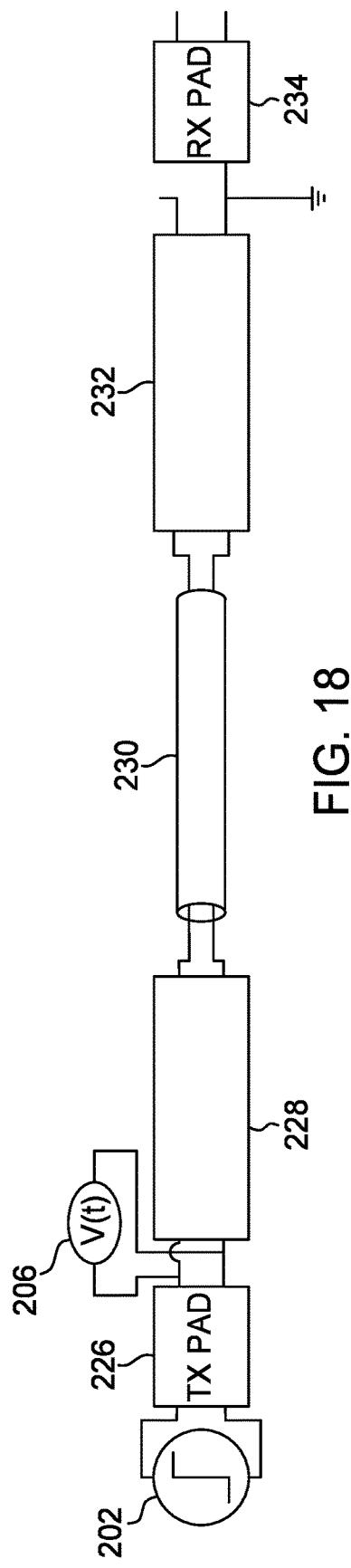
FIG. 18 illustrates a differential data transmission configuration with one of the signal lines open and the other shorted to ground.
Figure 19:
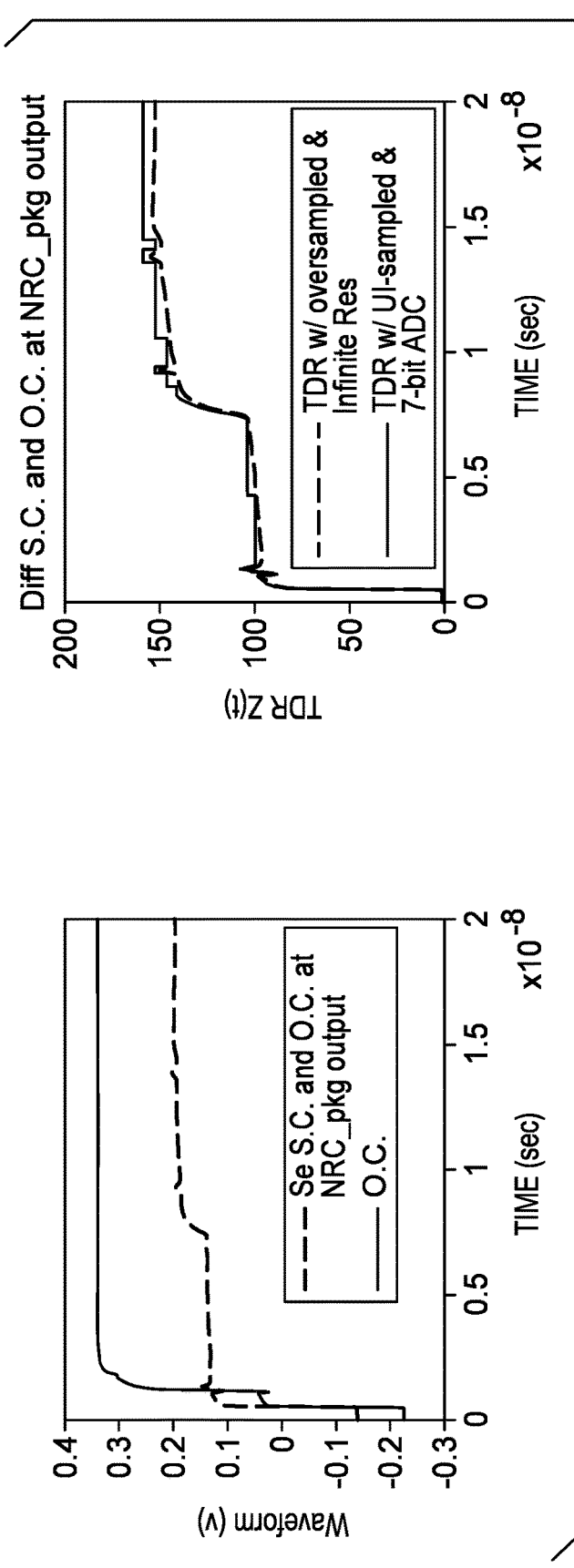
FIG. 19 illustrates the voltage/time waveforms and the TX pad impedances when one of the differential transmission line terminations is shorted to ground and the other is open-circuited.

FIG. 18 shows a differential data transmission configuration with one of the signal lines open and the other shorted to ground. FIG. 19 shows the voltage/time waveforms and TX pad impedances when one of the differential transmission line terminations is shorted to ground and the other is open-circuited.

As will be appreciated by one skilled in the art and having the benefit of this disclosure, the embodiments disclosed herein may be embodied as a system, method, apparatus, or computer programmed product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

While the foregoing is directed to embodiments of the present invention, other and further embodiments of the invention may be devised without departing from the basic scope thereof, and the scope thereof is determined by the claims that follow.

What is claimed is:

1. A method of using in-situ on-die time-domain reflectometry (TDR) for testing an integrated circuit equipment communications channel, comprising:
   sending a data pattern to a driver of a transmitter to generate a step waveform at a transmit node;
   coupling an analog-to-digital converter (ADC) of a receiver to a circuit node of a data circuit under test;
   opening a connection to the data circuit to obtain an open circuit step voltage when applying the step waveform to the transmit node;
   determining an output resistance of the transmit node with a measurement sample rate of less than two (2) gigahertz;
   terminating an output of the data circuit under test;
   applying the step waveform to the data circuit under test to measure a time varying detected voltage with the ADC of the receiver; and
   calculating a time varying load impedance from the time varying detected voltage, the open circuit step voltage and the output resistance of the transmit node.

2. The method according to claim 1, further comprising doing a loop back test of the transmit node with the ADC of the receiver using the step waveform.

3. The method according to claim 1, further comprising normalizing the time varying detected voltage with the time varying detected voltage measured at time zero (0).

4. The method according to claim 1, wherein the time varying load impedance is determined using equation:

$$Z_L(t) = \frac{V_{detected}(t)}{V_{step} - V_{detected}(t)} * R_{src}$$

where $Z_L(t)$ represents the time varying load impedance, $V_{detected}(t)$ represents the time varying detected voltage, $V_{step}$ represents the open circuit step voltage at the transmit node, and $R_{src}$ represents a real part of an output impedance of the transmit node.

5. The method according to claim 1, wherein resolution of the ADC is 6-bit.

6. The method according to claim 1, wherein resolution of the ADC is 7-bit.

7. The method according to claim 1, wherein the ADC is oversampled.

8. The method according to claim 1, further comprising determining a location of the time varying load impedance based upon a measured time.

9. The method according to claim 1, further comprising determining a plurality of locations of time varying load impedances based upon a plurality of respective measured times.

10. The method according to claim 1, further comprising determining a location of an open circuit fault on a data transmission circuit coupled to the transmit node by measuring a time when the time varying load impedance increases.

11. The method according to claim 1, further comprising determining a location of a short circuit fault on a data transmission circuit coupled to the transmit node by measuring a time when the time varying load impedance decreases.

12. An integrated circuit data transceiver (transmitter/receiver) having in-situ on-die time-domain reflectometry (TDR) circuits for testing a data communications channel while coupled to the data communications channel, comprising:
   a data driver coupled to a transmit node;
   a near-end ADC (analog-to-digital converter) adapted for coupling to the transmit node;
   a far-end ADC adapted for coupling to a receive node; and
   data signal connections adapted for coupling the transmit and receive nodes to the data communications channel;
   wherein
      when in a TDR test mode, the data driver provides a step waveform to the transmit node and the near-end ADC for monitoring a time varying voltage at the transmit node, and
      when in an operational mode, the data driver transmits data to the transmit node and the far-end ADC, at the receive node, receives the data.

13. The integrated circuit data transceiver according to claim 12, wherein the integrated circuit data transceiver further comprises a data serializer/deserializer (serdes).

14. The integrated circuit data transceiver according to claim 12, wherein the integrated circuit data transceiver further comprises a data multiplexer for switching the near-end ADC between the receive node and the transmit node during a loop back test.

15. A data communications system, comprising:
   an integrated circuit data transceiver (transmitter/receiver) having in-situ on-die time-domain reflectometry (TDR) circuits, wherein the integrated circuit data transceiver comprises
      a data driver coupled to a transmit node,
      a near-end analog-to-digital converter (ADC) adapted for coupling to either the transmit node,
      a far-end ADC adapted for coupling to a receive node,
      data signal connections adapted for coupling the transmit and receive nodes to a data communications channel,
   the data communications channel comprises at least one data communications cable coupled to the data signal connections, and
   at least one network adapter coupled to the at least one data communications cable and having receive and transmit capabilities, wherein
      when in a TDR test mode, the data driver provides a step waveform to the transmit node and the near-end ADC for monitoring a time varying voltage at the transmit node, and when in an operational mode, the data driver transmits data to the transmit node and the far-end ADC, at the receive node, receives the data.

16. The data communications system according to claim 15, further comprising a second network adapter coupled between the data signal connections and one of the at least one data communications cable.

17. The data communications system according to claim 15, wherein the at least one data communications cable is at least one coaxial cable.

18. The data communications system according to claim 15, wherein the at least one data communications cable is at least one twisted-pair cable.

19. The data communications system according to claim 15, wherein the at least one twisted-pair cable is at least one Ethernet cable.

20. The data communications system according to claim 15, further comprising a plurality of network adapters coupled between the data signal connections and a plurality of data communications cable.

* * * * *